(12) United States Patent
Lee et al.

(10) Patent No.: US 12,346,719 B2
(45) Date of Patent: Jul. 1, 2025

(54) SIGNAL PROCESSING DEVICE AND DISPLAY APPARATUS FOR VEHICLES INCLUDING THE SAME

(71) Applicant: LG ELECTRONICS INC., Seoul (KR)

(72) Inventors: Chulhee Lee, Seoul (KR); Junyoung Jung, Seoul (KR); Eunkoo Lee, Seoul (KR); Dongkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/710,850

(22) PCT Filed: Dec. 17, 2021

(86) PCT No.: PCT/KR2021/019300
§ 371 (c)(1),
(2) Date: May 16, 2024

(87) PCT Pub. No.: WO2023/113078
PCT Pub. Date: Jun. 22, 2023

(65) Prior Publication Data
US 2024/0427625 A1    Dec. 26, 2024

(51) Int. Cl.
*G06F 9/455*    (2018.01)

(52) U.S. Cl.
CPC ............... *G06F 9/45558* (2013.01); *G06F 2009/45595* (2013.01)

(58) Field of Classification Search
CPC ....... G06F 2009/45595; G06F 9/45558; B60R 16/033; B60K 37/02
See application file for complete search history.

(56) References Cited

U.S. PATENT DOCUMENTS

| | | | |
|---|---|---|---|
| 2016/0328254 A1 | 11/2016 | Ahmed et al. | |
| 2019/0379683 A1* | 12/2019 | Overby | H04W 4/48 |
| 2020/0226521 A1* | 7/2020 | Palavalli | G06F 9/5077 |
| 2021/0303322 A1* | 9/2021 | Babol | G06F 9/45529 |
| 2022/0321566 A1* | 10/2022 | Coyle | H04L 63/101 |

(Continued)

FOREIGN PATENT DOCUMENTS

| | | |
|---|---|---|
| JP | 6523298 B2 | 5/2019 |
| JP | 2020-201762 A | 12/2020 |

(Continued)

*Primary Examiner* — Kenneth Tang
(74) *Attorney, Agent, or Firm* — Birch, Stewart, Kolasch & Birch, LLP

(57) ABSTRACT

A signal processing device and a display apparatus for vehicles including the same are disclosed. The signal processing device according to an embodiment of the present disclosure includes a processor configured to perform signal processing for a display located in a vehicle, wherein the processor is configured to execute first to third virtual machines, wherein the first virtual machine operates as a server virtual machine, the second virtual machine and the third virtual machine operate as guest virtual machines, and the second virtual machine executes at least one container on a container engine, wherein the container includes an abstraction layer changed based on a platform, an operating system, or an executed application. Accordingly, the container may be efficiently installed and executed.

19 Claims, 26 Drawing Sheets

(56) References Cited

U.S. PATENT DOCUMENTS

2022/0335009 A1* 10/2022 Paul .................... G06F 16/11
2024/0028374 A1* 1/2024 Singh .................. G06F 11/3006

FOREIGN PATENT DOCUMENTS

| KR | 10-0422489 B1 | 3/2004 |
| KR | 10-2100323 B1 | 4/2020 |
| KR | 10-2020-0110229 A | 9/2020 |
| KR | 10-2187040 B1 | 12/2020 |

* cited by examiner

SIGNAL PROCESSING DEVICE AND DISPLAY APPARATUS FOR VEHICLES INCLUDING THE SAME

CROSS REFERENCE TO RELATED APPLICATIONS

This application is the National Phase of PCT International Application No. PCT/KR2021/019300, filed on Dec. 17, 2021, all of which are hereby expressly incorporated by reference into the present application.

BACKGROUND OF THE DISCLOSURE

1. Field of the Disclosure

The present disclosure relates to a signal processing device and a display apparatus for vehicles including the same, and more particularly to a signal processing device capable of efficiently installing and executing a container, and a display apparatus for vehicles including the same.

2. Description of the Related Art

A vehicle is an apparatus that a driver moves in a desired direction. A representative example of the vehicle is a car.

Meanwhile, a display apparatus for vehicles is located in the vehicle for convenience of users who use the vehicle.

For example, a display is disposed in a cluster in order to display various kinds of information. Meanwhile, in order to display vehicle driving information, various displays, such as an audio video navigation (AVN) display, are located in the vehicle, in addition to the cluster.

In the case in which the number of displays in the display apparatus for vehicles is increased, however, signal processing for the displays is complicated.

SUMMARY

It is an object of the present disclosure to provide a signal processing device capable of efficiently installing and executing a container, and a display apparatus for vehicles including the signal processing device.

Meanwhile, it is another object of the present disclosure to provide a signal processing device capable of efficiently installing and executing a container based on platforms, operating systems, or executed applications, and a display apparatus for vehicles including the signal processing device.

Meanwhile, it is yet another object of the present disclosure to provide a signal processing device capable of minimizing a storage space required for installing a container, and a display apparatus for vehicles including the signal processing device.

Meanwhile, it is yet another object of the present disclosure to provide a signal processing device capable of reassembling a container, and a display apparatus for vehicles including the signal processing device.

Meanwhile, it is yet another object of the present disclosure to provide a signal processing device capable of moving a container, and a display apparatus for vehicles including the signal processing device.

Meanwhile, it is further object of the present disclosure to provide a signal processing device capable of efficiently installing and executing a container even when operating systems of virtual machines are different from each other, and a display apparatus for vehicles including the signal processing device.

In accordance with an aspect of the present disclosure, the above and other objects can be accomplished by providing a signal processing device including a processor configured to perform signal processing for a display located in a vehicle, wherein the processor is configured to execute first to third virtual machines, wherein the first virtual machine operates as a server virtual machine, the second virtual machine and the third virtual machine operate as guest virtual machines, and the second virtual machine executes at least one container on a container engine, wherein the container includes an abstraction layer changed based on a platform, an operating system, or an executed application.

Meanwhile, the abstraction layer in the container may include binary, library, and configuration files required for the application.

Meanwhile, the container may include a base image layer, the abstraction layer on the base image layer, and a writable layer on the abstraction layer.

Meanwhile, when the container is executed in the second virtual machine based on a first platform, the container may include a first abstraction layer; and when the container is executed in the second virtual machine based on a second platform different from the first platform, the container may include a second abstraction layer different from the first abstraction layer.

Meanwhile, when the container is executed in the second virtual machine based on a first operating system, the container may include a first abstraction layer; and when the container is executed in the second virtual machine based on a second operating system different from the first operating system, the container may include a second abstraction layer different from the first abstraction layer.

Meanwhile, when the container is executed in the second virtual machine for a first application, the container may include a first abstraction layer; and when the container is executed in the second virtual machine for a second application different from the first application, the container may include a second abstraction layer different from the first abstraction layer.

Meanwhile, the processor may be configured to execute a hypervisor and to execute the first to third virtual machines on the hypervisor.

Meanwhile, the processor may be configured to execute a container engine in the second virtual machine and to execute the container on the container engine.

Meanwhile, the processor may be configured to download a service container from a server, check dependency of a pre-installed first container, generate the abstraction layer based on the downloaded service container, and add the abstraction layer in the first container.

Meanwhile, the processor may be configured to configure the abstraction layer based on system information from the first virtual machine and binary, library, and configuration files in the second virtual machine.

Meanwhile, the processor may be configured to download a service container from a server and to reassemble the abstraction layer based on the platform.

Meanwhile, the processor may be configured to transmit a service container, except the abstraction layer in the second virtual machine, to the third virtual machine, and to generate a second container in the third virtual machine based on the service container and a second abstraction layer received from the server.

Meanwhile, the abstraction layer in the container may include binary, library, and configuration files related to the platform, binary, library, and configuration files related to the application, and binary and library files for executing the container.

Meanwhile, the processor may be configured to share and transmit some of binary, framework, library, and configuration files, which are required for executing the application, in the abstraction layer of the container for generating another container.

Meanwhile, the second virtual machine and the third virtual machine may execute on different operating systems.

In accordance with another aspect of the present disclosure, there is provided a signal processing device including a processor configured to perform signal processing for a display located in a vehicle, wherein the processor is configured to execute first and second virtual machines, wherein the first virtual machine operates as a server virtual machine, the second virtual machine operates as a guest virtual machine, and the second virtual machine executes at least one container on a container engine, wherein the container includes an abstraction layer changed based on a platform, an operating system, or an executed application.

In accordance with yet another aspect of the present disclosure, there is provided a display apparatus for vehicles, the display apparatus including: a first display; a second display; and a signal processing device including a processor configured to perform signal processing for the first display and the second display, wherein the processor is configured to execute first to third virtual machines, wherein the first virtual machine operates as a server virtual machine, the second virtual machine and the third virtual machine operate as guest virtual machines, and the second virtual machine executes at least one container on a container engine, wherein the container includes an abstraction layer changed based on a platform, an operating system, or an executed application.

Effect of the Disclosure

A signal processing device according to an embodiment of the present disclosure includes a processor configured to perform signal processing for a display located in a vehicle, wherein the processor is configured to execute first to third virtual machines, wherein the first virtual machine operates as a server virtual machine, the second virtual machine and the third virtual machine operate as guest virtual machines, and the second virtual machine executes at least one container on a container engine, wherein the container includes an abstraction layer changed based on a platform, an operating system, or an executed application. Accordingly, the container may be efficiently installed and executed. Particularly, the container may be efficiently installed and executed based on platforms, operating systems, or executed applications. In addition, a storage space required for installing the container may be minimized.

Meanwhile, the abstraction layer in the container may include binary, library, and configuration files required for the application. Accordingly, the container may be efficiently installed and executed.

Meanwhile, the container may include a base image layer, the abstraction layer on the base image layer, and a writable layer on the abstraction layer. Accordingly, the container may be efficiently installed and executed.

Meanwhile, when the container is executed in the second virtual machine based on a first platform, the container may include a first abstraction layer; and when the container is executed in the second virtual machine based on a second platform different from the first platform, the container may include a second abstraction layer different from the first abstraction layer. Accordingly, the container may be efficiently installed and executed based on platforms.

Meanwhile, when the container is executed in the second virtual machine based on a first operating system, the container may include a first abstraction layer; and when the container is executed in the second virtual machine based on a second operating system different from the first operating system, the container may include a second abstraction layer different from the first abstraction layer. Accordingly, the container may be efficiently installed and executed based on operating systems.

Meanwhile, when the container is executed in the second virtual machine for a first application, the container may include a first abstraction layer; and when the container is executed in the second virtual machine for a second application different from the first application, the container may include a second abstraction layer different from the first abstraction layer. Accordingly, the container may be efficiently installed and executed based on executed applications.

Meanwhile, the processor may be configured to execute a hypervisor and to execute the first to third virtual machines on the hypervisor. Accordingly, the plurality of virtual machines may be efficiently executed.

Meanwhile, the processor may be configured to execute a container engine in the second virtual machine and to execute the container on the container engine. Accordingly, the container may be efficiently installed and executed.

Meanwhile, the processor may be configured to download a service container from a server, check dependency of a pre-installed first container, generate the abstraction layer based on the downloaded service container, and add the abstraction layer in the first container. Accordingly, the container may be efficiently installed and executed. In addition, a storage space required for installing the container may be minimized.

Meanwhile, the processor may be configured to configure the abstraction layer based on system information from the first virtual machine and binary, library, and configuration files in the second virtual machine. Accordingly, the container may be efficiently installed and executed.

Meanwhile, the processor may be configured to download a service container from a server and to reassemble the abstraction layer based on the platform. Accordingly, the container may be efficiently installed and executed. In addition, a storage space required for installing the container may be minimized.

Meanwhile, the processor may be configured to transmit a service container, except the abstraction layer in the second virtual machine, to the third virtual machine, and to generate a second container in the third virtual machine based on the service container and a second abstraction layer received from the server. Accordingly, the container may be efficiently installed and executed. In addition, a storage space required for installing the container may be minimized.

Meanwhile, the abstraction layer in the container may include binary, library, and configuration files related to the platform, binary, library, and configuration files related to the application, and binary and library files for executing the container. Accordingly, the container may be efficiently installed and executed.

Meanwhile, the processor may be configured to share and transmit some of binary, framework, library, and configuration files, which are required for executing the application, in the abstraction layer of the container for generating another container. Accordingly, the container may be efficiently installed and executed. In addition, a storage space required for installing the container may be minimized.

Meanwhile, the second virtual machine and the third virtual machine may execute on different operating systems. Accordingly, the container may be efficiently installed and executed even when operating systems of a plurality of virtual machines are different from each other.

A signal processing device according to another embodiment of the present disclosure includes a processor configured to perform signal processing for a display located in a vehicle, wherein the processor is configured to execute first and second virtual machines, wherein the first virtual machine operates as a server virtual machine, the second virtual machine operates as a guest virtual machine, and the second virtual machine executes at least one container on a container engine, wherein the container includes an abstraction layer changed based on a platform, an operating system, or an executed application. Accordingly, the container may be efficiently installed and executed. Particularly, the container may be efficiently installed and executed based on platforms, operating systems, or executed applications. In addition, a storage space required for installing the container may be minimized.

A display apparatus for vehicles according to an embodiment of the present disclosure includes: a first display; a second display; and a signal processing device including a processor configured to perform signal processing for the first display and the second display, wherein the processor is configured to execute first to third virtual machines, wherein the first virtual machine operates as a server virtual machine, the second virtual machine and the third virtual machine operate as guest virtual machines, and the second virtual machine executes at least one container on a container engine, wherein the container includes an abstraction layer changed based on a platform, an operating system, or an executed application. Accordingly, the container may be efficiently installed and executed. Particularly, the container may be efficiently installed and executed based on platforms, operating systems, or executed applications. In addition, a storage space required for installing the container may be minimized.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
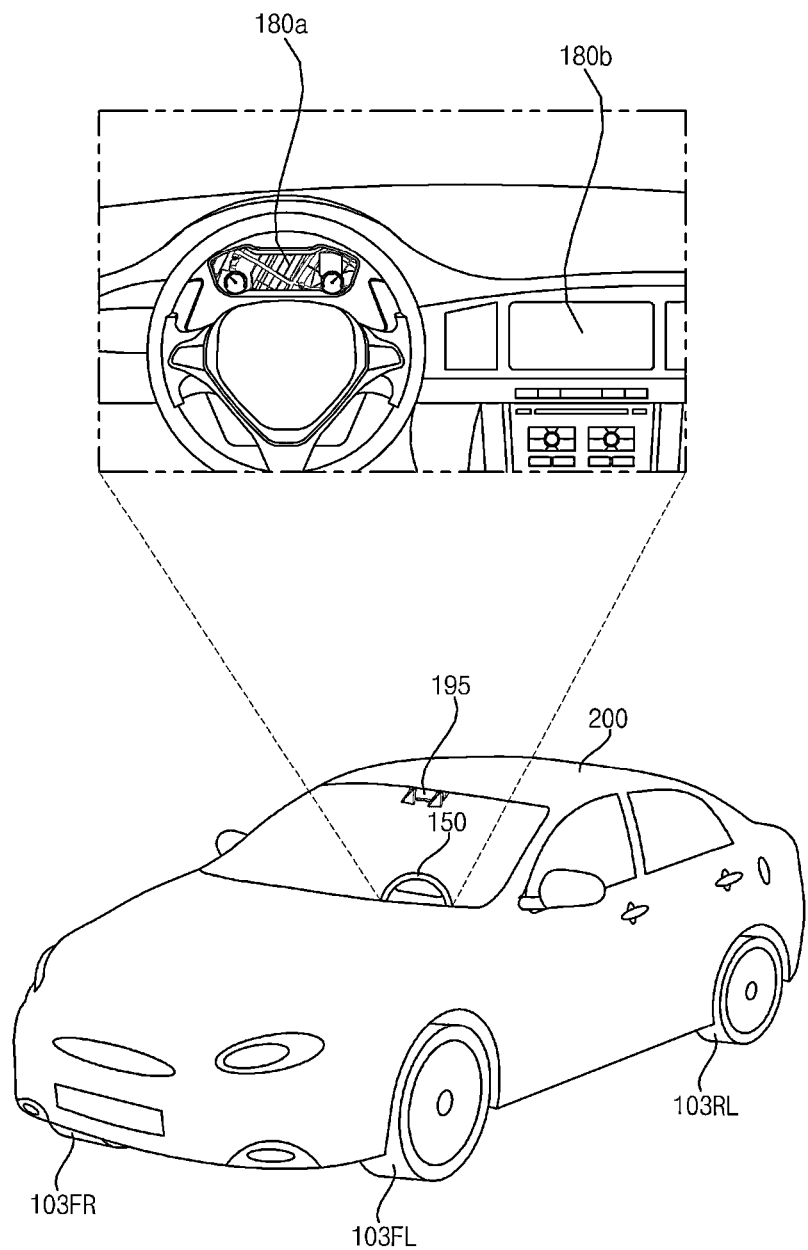
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, ... rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
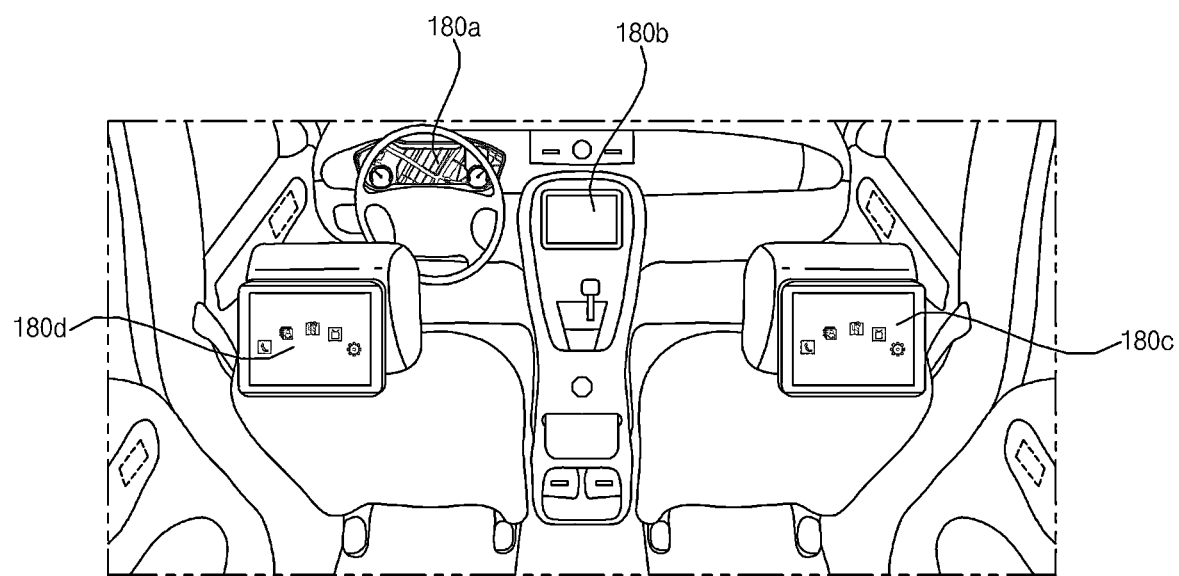
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be located in the vehicle 200.

Figure 2:
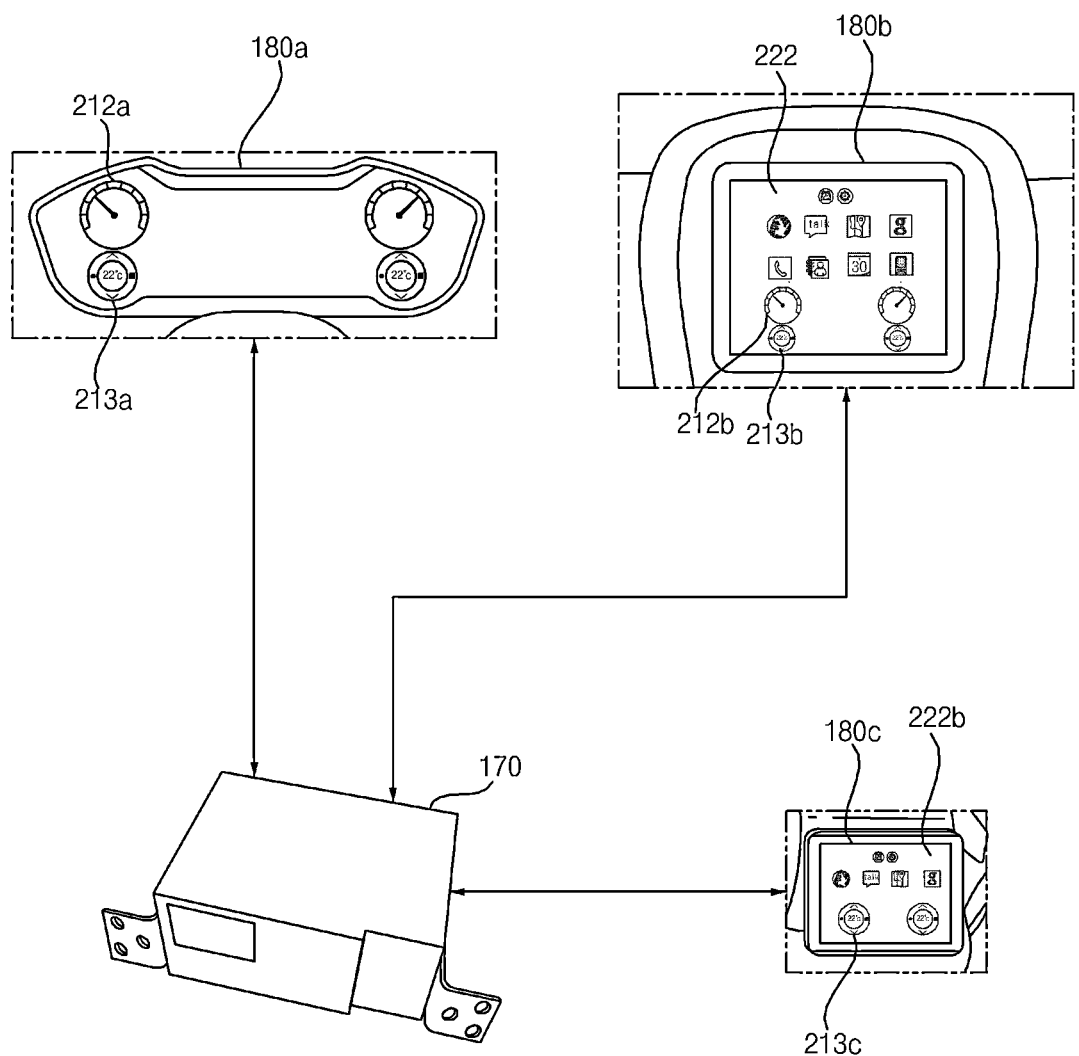
FIG. 2 is a view showing the external appearance of a display apparatus for vehicles according to an embodiment of the present disclosure.

FIG. 2 is a view showing the external appearance of a display apparatus for vehicles according to an embodiment of the present disclosure.

The display apparatus 100 for vehicles according to the embodiment of the present disclosure may include a plurality of displays 180a and 180b and a signal processing device 170 configured to perform signal processing in order to display images and information on the plurality of displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines 520 to 540 may be executed by a hypervisor 505 in the processor 175.

The second virtual machine 530 may be operated for the first display 180a, and the third virtual machine 540 may be operated for the second display 180b.

Meanwhile, the first virtual machine 520 in the processor 175 may be configured to set a shared memory 508 based on the hypervisor 505 for transmission of the same data to the second virtual machine 530 and the third virtual machine 540. Consequently, the first display 180a and the second display 180b in the vehicle may display the same information or the same images in a synchronized state.

Meanwhile, the first virtual machine 520 in the processor 175 shares at least some of data with the second virtual machine 530 and the third virtual machine 540 for divided processing of data. Consequently, the plurality of virtual machines for the plurality of displays in the vehicle may divide and process data.

Meanwhile, the first virtual machine 520 in the processor 175 may receive and process wheel speed sensor data of the vehicle, and may transmit the processed wheel speed sensor data to at least one of the second virtual machine 530 or the third virtual machine 540. Consequently, at least one virtual machine may share the wheel speed sensor data of the vehicle.

Meanwhile, the display apparatus 100 for vehicles according to the embodiment of the present disclosure may further include a rear seat entertainment (RSE) display 180c configured to display driving state information, simple navigation information, various kinds of entertainment information, or an image.

The signal processing device 170 may further execute a fourth virtual machine (not shown), in addition to the first to third virtual machines 520 to 540, on the hypervisor 505 in the processor 175 to control the RSE display 180c.

Consequently, it is possible to control various displays 180a to 180c using a single signal processing device 170.

Meanwhile, some of the plurality of displays 180a to 180c may be operated based on a Linux Operating System (OS), and others may be operated based on a Web Operating System (OS).

Meanwhile, in response to touch input to any one of the displays 180a and 180b or 180a to 180c configured to be operated under various operating systems, the signal processing device 170 according to the embodiment of the present disclosure may be configured to rapidly and accurately process the touch input.

Meanwhile, FIG. 2 illustrates that a vehicle speed indicator 212a and an in-vehicle temperature indicator 213a are displayed on the first display 180a, a home screen 222 including a plurality of applications, a vehicle speed indicator 212b, and an in-vehicle temperature indicator 213b is displayed on the second display 180b, and a home screen 222b including a plurality of applications and an in-vehicle temperature indicator 213c is displayed on the third display 180c.

Figure 3:
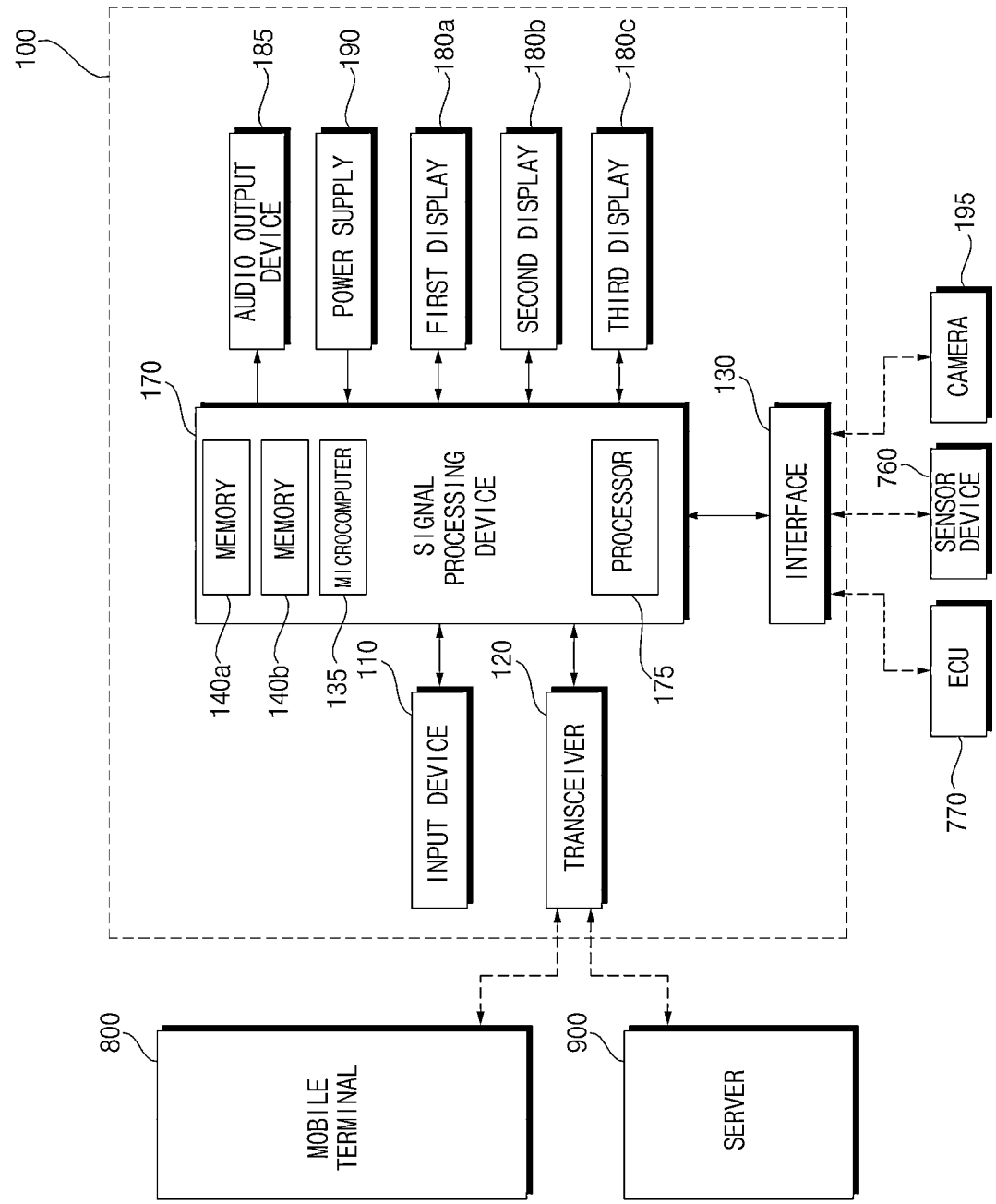
FIG. 3 illustrates an example of an internal block diagram of the display apparatus for vehicles of FIG. 2.

FIG. 3 illustrates an example of an internal block diagram of the display apparatus for vehicles according to the embodiment of the present disclosure.

Referring to the figure, the display apparatus 100 for vehicles according to the embodiment of the present disclosure may include an input device 110, a transceiver 120, an interface 130, a signal processing device 170, a plurality of displays 180a to 180c, an audio output device 185, and a power supply 190.

The input device 110 may include a physical button or pad for button input or touch input.

Meanwhile, the input device 110 may include a touch sensor (not shown) configured to sense touch input to the displays 180a, 180b, and 180c.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal 800 of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 800 or the server 900. To this end, the transceiver 120 may include a mobile communication module (not shown).

The interface 130 may receive sensor information from an electronic control unit (ECU) 770 or a sensor device 760, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195, lidar (not shown), or radar (not shown), etc., and may transmit the received information to the signal processing device 170.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicles.

Meanwhile, the signal processing device 170 may be implemented in the form of a system on chip (SOC).

The signal processing device 170 may include the processor 175 configured to perform signal processing for vehicle displays 180*a*, 180*b*, and 180*c*, a first memory 140*a* and a second memory 140*b* configured to store various data, and a microcomputer 135.

The first memory 140*a*, which is a non-volatile memory, may store various data even in a standby mode or during power-off.

For example, in response to entry into the standby mode, the first memory 140*a* may store a file corresponding to a first application executed on any one of a plurality of virtual machines 510 to 550.

In another example, the first memory 140*a* may store operating systems (OS).

Meanwhile, the first memory 140*a* may store various data for overall operation of the display apparatus 100 for vehicles, such as programs for processing or control of the signal processing device 170, and the like.

Meanwhile, the second memory 140*b* is a volatile memory, and various data therein are erased in the standby mode or during power-off, and the second memory 140*b* may temporarily store data in an active mode.

For example, in response to a transition from the standby mode to the active mode, the second memory 140*b* may load the files stored in the first memory 140*a*.

In another example, in response to a transition from the standby mode to the active mode, the second memory 140*b* may load the operating systems (OS) stored in the first memory 140*a*.

Figure 5:
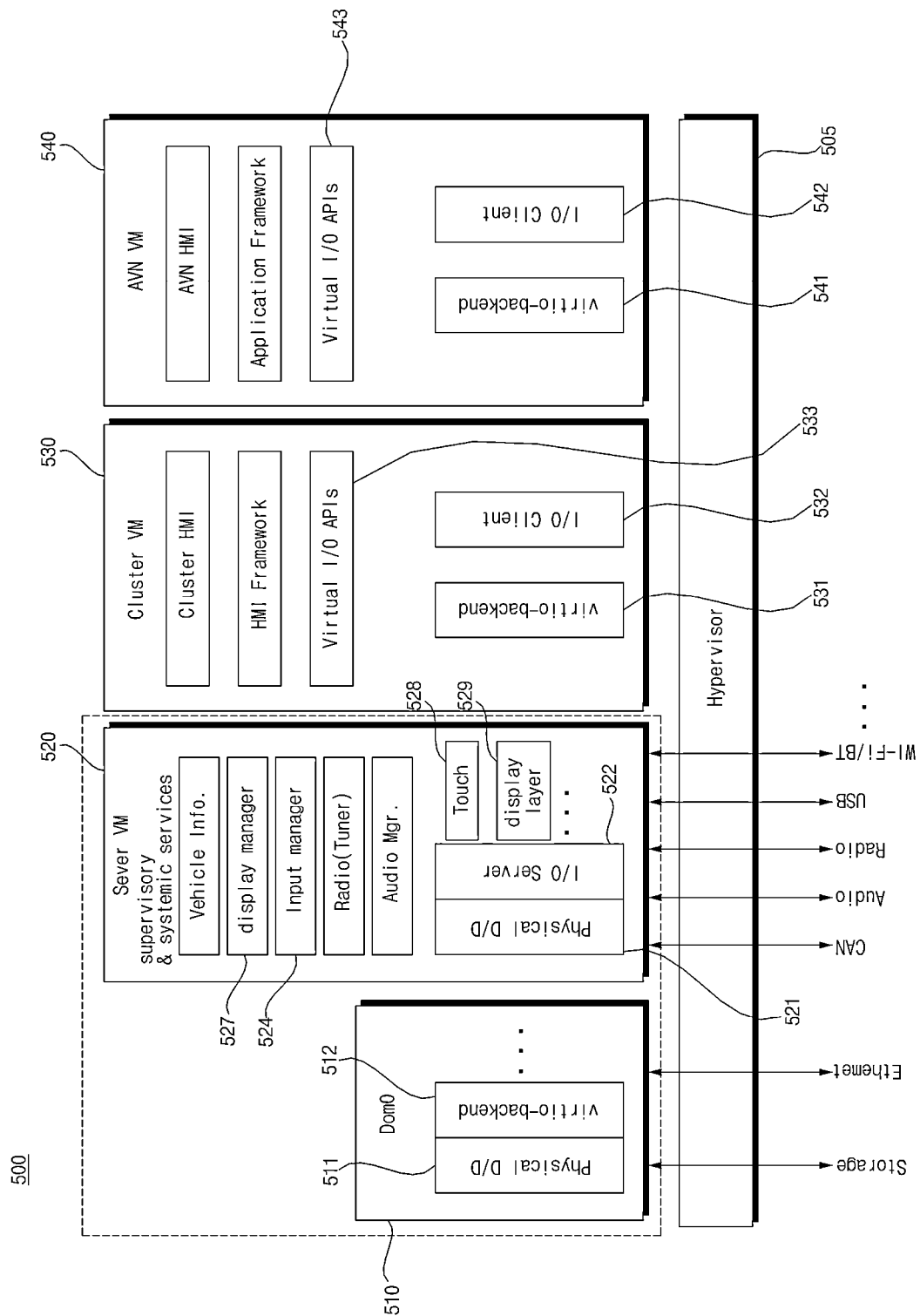
FIG. 5 is a diagram illustrating an example of a system executed in a signal processing device of the present disclosure.

Meanwhile, the processor 175 may execute the hypervisor 505 (see FIG. 5).

Meanwhile, processor 175 may execute the first to third virtual machines 520 to 540 on the hypervisor 505 (see FIG. 5) in the processor 175.

Meanwhile, the processor 175 may further execute a legacy virtual machine configured to receive and process Ethernet data. For example, as shown in FIG. 5, the legacy virtual machine 510 may be executed by the first virtual machine 520 in the processor 175.

Among the first to third virtual machines 520 to 540 (see FIG. 5), the first virtual machine 520 may be called a server virtual machine, and the second and third virtual machines 530 and 540 may be called guest virtual machines.

In this case, the second virtual machine 530 may be operated for the first display 180*a*, and the third virtual machine 540 may be operated for the second display 180*b*.

For example, the first virtual machine 520 in the processor 175 may receive, process, and output vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may process most of the data, whereby 1:N data sharing may be achieved.

As another example, the first virtual machine 520 may directly receive and process CAN communication data, audio data, radio data, USB data, and wireless communication data for the second and third virtual machines 530 and 540.

The first virtual machine 520 may transmit the processed data to the second and third virtual machines 530 and 540.

Consequently, only the first virtual machine 520, among the first to third virtual machines 520 to 540, may receive communication data and external input data, and may perform signal processing, whereby load in signal processing by the other virtual machines may be reduced and 1:N communication may be achieved, and therefore synchronization at the time of data sharing may be achieved.

Meanwhile, the first virtual machine 520 writes a portion of data to a first shared memory (not shown) to transmit the data to the second virtual machine 530, and writes other portions of data to the first shared memory (not shown) to transmit the data to the third virtual machine 540. Each of the second virtual machine 530 and the third virtual machine 540 may be configured to process the received data and write the processed data to a second shared memory (not shown).

At this time, data may be any one of image data, audio data, navigation data, and voice recognition data.

Meanwhile, the first virtual machine 520 may process some other of data, and may be configured to write the processed data in the second shared memory (not shown). That is, the first virtual machine 520 may perform data processing in addition to the second virtual machine 530 and the third virtual machine 540.

Meanwhile, in response to a fourth virtual machine 550 configured to be operated for the third display 180*c* being executed in the processor 175, the first virtual machine 520 may write some other of data in the first shared memory (not shown), and the fourth virtual machine 550 may process the received data and may be configured to write the processed data in the second shared memory (not shown).

Meanwhile, the first virtual machine 520 may generate command queues for distributed processing of data in the second virtual machine 530 and the third virtual machine 540. Consequently, the plurality of virtual machines may divide and process data.

Meanwhile, in response to the second virtual machine 530 and the third virtual machine 540 sharing the same data, the first virtual machine 520 in the processor 175 may generate one command queue. Consequently, the same data may be synchronized and shared.

Meanwhile, the first virtual machine 520 may generate command queues corresponding to the number of virtual machines for distributed processing of data.

Meanwhile, the first virtual machine 520 may be configured to transmit at least some of data to at least one of the second virtual machine 530 or the third virtual machine 540 for distributed processing of data.

For example, the first virtual machine 520 may allocate the first shared memory (not shown) for transmitting at least some of data to at least one of the second virtual machine 530 or the third virtual machine 540, and image data processed by the second virtual machine 530 or the third virtual machine 540 may be written in the second shared memory (not shown).

Meanwhile, the first virtual machine 520 may be configured to write data in the shared memory 508, whereby the second virtual machine 530 and the third virtual machine 540 share the same data.

For example, the first virtual machine 520 may be configured to write radio data or wireless communication data in the shared memory 508, whereby the second virtual machine 530 and the third virtual machine 540 share the same data. Consequently, 1:N data sharing may be achieved.

Eventually, the first virtual machine 520 may process most of the data, whereby 1:N data sharing may be achieved.

Meanwhile, the first virtual machine 520 in the processor 175 may be configured to set the shared memory 508 based on the hypervisor 505 in order to transmit the same data to the second virtual machine 530 and the third virtual machine 540.

That is, the first virtual machine 520 in the processor 175 may transmit the same data to the second virtual machine 530 and the third virtual machine 540 in a synchronized state using the shared memory 508 based on the hypervisor 505.

Consequently, the plurality of displays 180a and 180b in the vehicle may display the same images in a synchronized state.

Meanwhile, the signal processing device 170 may process various signals, such as an audio signal, an image signal, and a data signal. To this end, the signal processing device 170 may be implemented in the form of a system on chip (SOC).

Meanwhile, the shared memory 508 may be implemented in the first memory 140a.

Figure 4:
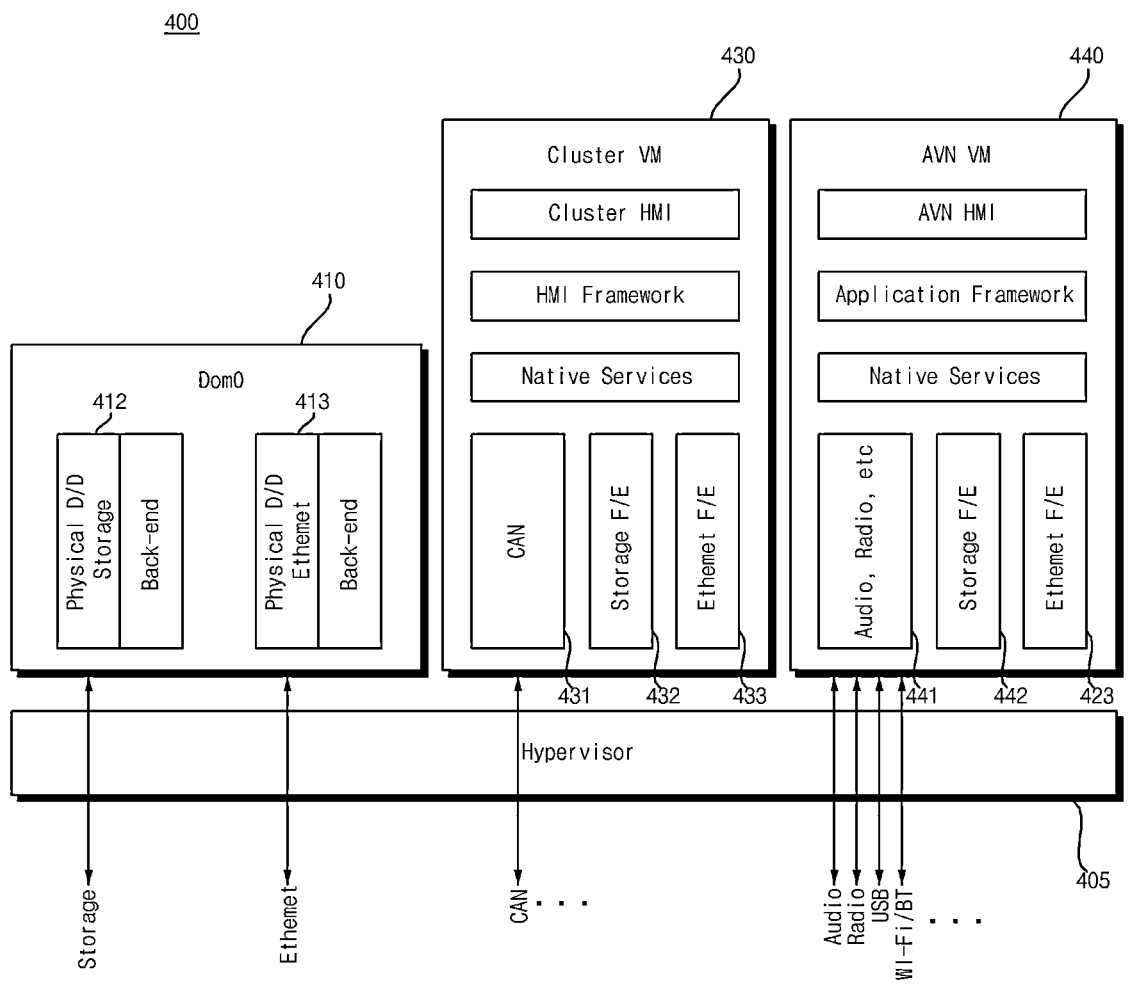
FIG. 4 is a view showing a system executed in a signal processing device related to the present disclosure.

FIG. 4 is a view showing a system executed in a signal processing device related to the present disclosure.

Referring to the figure, FIG. 4 is a view illustrating that virtual machines are used for the cluster display 180a and the AVN display 180b.

The system 400 executed in the signal processing device of FIG. 4 illustrates that a cluster virtual machine 430 and an AVN virtual machine 440 are executed through a hypervisor 405 in the processor 175.

Meanwhile, the system 400 executed in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for CAN communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that CAN communication data are input and output only in the cluster virtual machine 430, whereby the CAN communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines for inputting and outputting various memory data and communication data not in the guest virtual machines but in the server virtual machine. This will be described with reference to FIG. 5 and subsequent figures.

FIG. 5 is a diagram illustrating an example of a system executed in a signal processing device of the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 may be a virtual machine for the cluster display 180a, and the third virtual machine 540 may be a virtual machine for the AVN display 180b.

That is, the second virtual machine 530 and the third virtual machine 540 may be operated for image rendering of the cluster display 180a and the AVN display 180b, respectively.

Meanwhile, the system 500 executed in the signal processing device 170 of FIG. 5 illustrates that a legacy virtual machine 510 is also executed on the hypervisor 505 in the processor 175.

The legacy virtual machine 510 may include an interface 511 for data communication with the memory 140 and Ethernet communication.

The figure illustrates that the interface 511 is a physical device driver; however, various modifications are possible.

Meanwhile, the legacy virtual machine 510 may further include a virtio-backend interface 512 for data communication with the second and third virtual machines 530 and 540.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, may control radio data and audio data at a supervisor level, and may provide the data to a plurality of guest virtual machines, such as the second and third virtual machines 530 and 540.

Meanwhile, the first virtual machine 520, which is a server virtual machine, may process vehicle data, sensor data, and surroundings-of-vehicle information, and may provide the processed data or information to a plurality of guest virtual machines, such as the second and third virtual machines 530 and 540.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 or Ethernet data by Ethernet communication from the virtio-backend interface 512 of the legacy virtual machine 510 through the virtio-backend interface.

Next, the third virtual machine 540 may include an input and output client interface 542 for data communication with the first virtual machine 520 and APIs 543 configured to control the input and output client interface 542.

In addition, the third virtual machine 540 may include a virtio-backend interface for data communication with the legacy virtual machine 510.

The third virtual machine 540 may receive memory data by communication with the memory 140 or Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, touch input to the first display 180a or the second display 180b is input only to the first virtual machine 520 and is not input to the second virtual machine 530 and the third virtual machine 540. Information regarding the touch input is transmitted to the second virtual machine 530 or the third virtual machine 540.

Consequently, the touch input may be rapidly and accurately processed. In addition, the touch input may be rapidly and accurately processed even though the number of virtual machines that are executed is increased.

Meanwhile, in the system 500 of FIG. 5, the second and third virtual machines 530 and 540 may be operated based on different operating systems.

For example, the second virtual machine 530 may be operated based on a Linux OS, and the third virtual machine 540 may be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, the same data or the same images may be shared in a synchronized state. Eventually, the plurality of displays 180a and 180b may display the same data or the same images in a synchronized state.

Meanwhile, the first virtual machine 520 transmits information regarding the touch input to the second virtual machine 530 or the third virtual machine 540 even though the second and third virtual machines 530 and 540 are operated based on different operating systems. Consequently, the touch input may be rapidly and accurately processed even though the second and third virtual machines 530 and 540 are operated based on different operating systems (OS).

Meanwhile, the first virtual machine 520 may include a display manager 527 configured to control overlays displayed on the first display 180a and the second display 180b through the second and third virtual machines 530 and 540 and a display layer server 529.

The display layer server 529 may receive a first overlay provided by the second virtual machine 530 and a second overlay provided by the third virtual machine 540.

Meanwhile, the display layer server 529 may transmit a virtual overlay, which is different from the first overlay or the second overlay, to at least one of the second virtual machine 530 or the third virtual machine 540.

Meanwhile, the display manager 527 in the first virtual machine 520 may receive the first overlay provided by the second virtual machine 530 and the second overlay provided by the third virtual machine 540 through the display layer server 529.

The display manager 527 in the first virtual machine 520 may be configured to transmit the virtual overlay, which is different from the first overlay or the second overlay, to at least one of the second virtual machine 530 or the third virtual machine 540 through the display layer server 529.

In response thereto, the second virtual machine 530 may be configured to combine and display the first overlay and the virtual overlay on the first display 180a.

In addition, the third virtual machine 540 may be configured to combine and display the second overlay and the virtual overlay on the second display 180b.

Meanwhile, the first virtual machine 520 may include an input manager 524 configured to receive an input signal from the outside. At this time, the input signal may be an input signal from a predetermined button (start button) in the vehicle, a touch input signal, or a voice input signal.

For example, the input manager 524 in the first virtual machine 520 may receive touch input from the first display 180a or the second display 180b.

Meanwhile, the first virtual machine 520 may include a touch server 528 configured to transmit information regarding the touch input related to the touch input from the first display 180a or the second display 180b to the second virtual machine 530 or the third virtual machine 540.

For example, in response to touch input corresponding to the first display 180a, the touch server 528 in the first virtual machine 520 may transmit information regarding the touch input to the second virtual machine 530.

Meanwhile, the touch server 528 in the first virtual machine 520 may receive the touch input from the first display 180a or the second display 180b.

Figure 6:
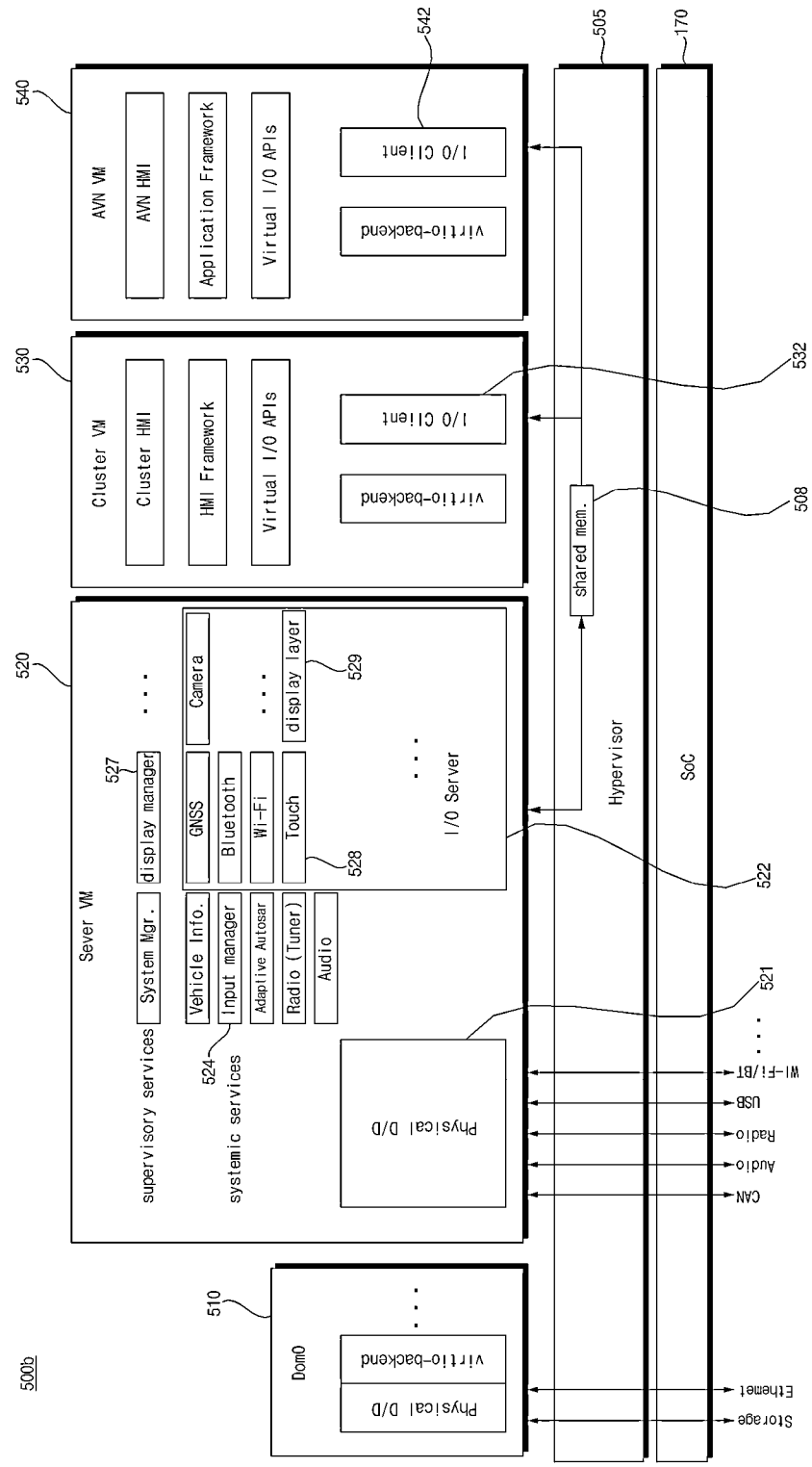
FIG. 6 is a diagram illustrating another example of a system executed in a signal processing device of the present disclosure.

FIG. 6 is a diagram illustrating another example of a system executed in a signal processing device of the present disclosure.

Referring to the figure, in the system 500b executed by the processor 175 in the signal processing device 170, the processor 175 in the signal processing device 170 executes the first to third virtual machines 520 to 540 on the hypervisor 505 in the processor 175, and the first virtual machine 520 in the processor 175 is configured to the shared memory 508 based on the hypervisor 505 for transmission of data to the second and third virtual machines 530 and 540.

For example, information regarding touch input may be illustrated as the data. Consequently, the information regarding touch input may be transmitted to the second virtual machine 530 or the third virtual machine 540. Eventually, the touch input to the first display 180a or the second display 180b may be rapidly and accurately processed. In addition, the touch input may be rapidly and accurately processed even though the number of virtual machines that are executed is increased.

As another example, image data may be illustrated as the data. Consequently, an image may be displayed on the first display 180a or the second display 180b.

Meanwhile, in response to the same image data being shared in the shared memory 508, the plurality of displays 180a and 180b in the vehicle may display the same data in a synchronized state.

As another example, CAN communication data, audio data, radio data, USB data, wireless communication data, or position information data may be illustrated as the data.

Consequently, information regarding the data may be displayed on the first display 180a or the second display 180b.

Meanwhile, although not shown in FIG. 6, the legacy virtual machine 510 may transmit memory data from the memory 140 or Ethernet data by Ethernet communication to the second and third virtual machines 530 and 540 using the shared memory 508 based on the hypervisor 505. Consequently, information corresponding to the memory data or the Ethernet data may be displayed on the first display 180a or the second display 180b.

Meanwhile, the first virtual machine 520 in the system 500b of FIG. 6 may include a display manager 527, a display layer server 529, an input manager 524, and a touch server 528, similarly to the first virtual machine 520 in the system 500 of FIG. 5.

Meanwhile, the input and output server interface 522 in the first virtual machine 520 in the system 500b of FIG. 6 may include a display layer server 529 and a touch server 528, unlike FIG. 5.

The operation of the display manager 527, the display layer server 529, the input manager 524, and the touch server 528 is the same as those of FIG. 5, such that a description thereof will be omitted.

Meanwhile, the first virtual machine 520 of FIG. 6 may further include a system manager for overall system control, a vehicle information manager for vehicle information management, an audio manager for audio control, and a radio manager for radio control.

Meanwhile, the input and output server interface 522 in the first virtual machine 520 in the system 500b of FIG. 6 may further include a GNSS server for GPS information input and output, a Bluetooth server for Bluetooth input and output, a Wi-Fi server for Wi-Fi input and output, and a camera server for camera data input and output.

Figure 7:
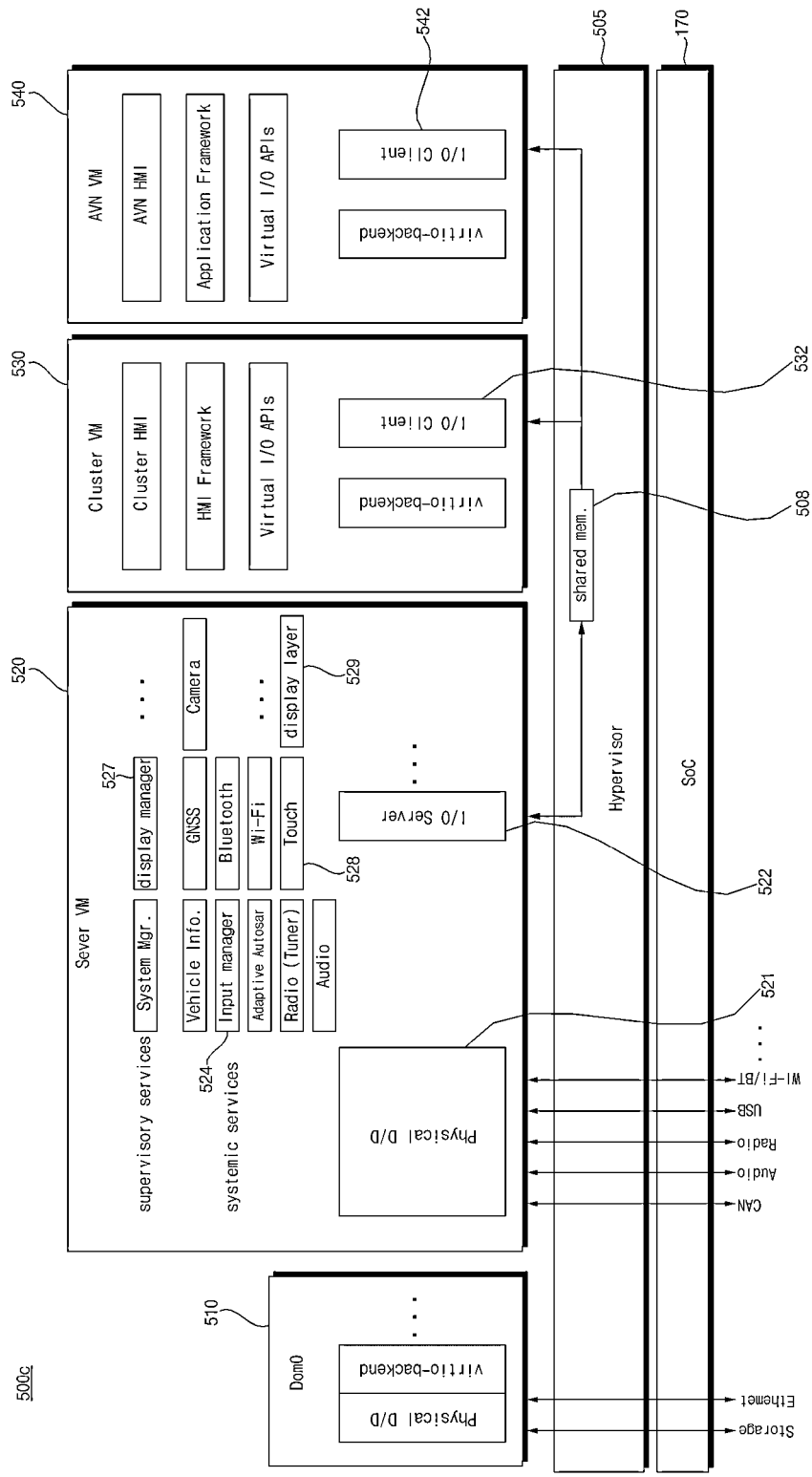
FIG. 7 is a diagram illustrating a yet another example of a system executed in a signal processing device of the present disclosure.

FIG. 7 is a diagram illustrating a yet another example of a system executed in a signal processing device of the present disclosure.

Referring to the figure, the system 500c executed by the processor 175 in the signal processing device of FIG. 7 is similar to the system 500b of FIG. 6.

That is, like FIG. 6, the processor 175 of FIG. 7 executes the first to third virtual machines 520 to 540 on the hypervisor 505 in the processor 175.

In FIG. 7, however, the display layer server 529 and the touch server 528 may be provided and executed in the first virtual machine 520 outside the input and output server interface 522, unlike FIG. 6.

In addition, the GNSS server for GPS information input and output, the Bluetooth server for Bluetooth input and output, the Wi-Fi server for Wi-Fi input and output, and the camera server for camera data input and output may be provided and executed in the first virtual machine 520 outside the input and output server interface 522, unlike FIG. 6.

That is, the display manager 527, the display layer server 529, the input manager 524, and the touch server 528 may be provided and executed in the first virtual machine 520.

Meanwhile, the input and output server interface 522 in the first virtual machine 520 in the system 500b of FIG. 6 may include a display layer server 529 and a touch server 528, unlike FIG. 5.

The operation of the display manager 527, the display layer server 529, the input manager 524, and the touch server 528 is the same as those of FIG. 5, such that a description thereof will be omitted.

Figure 8:
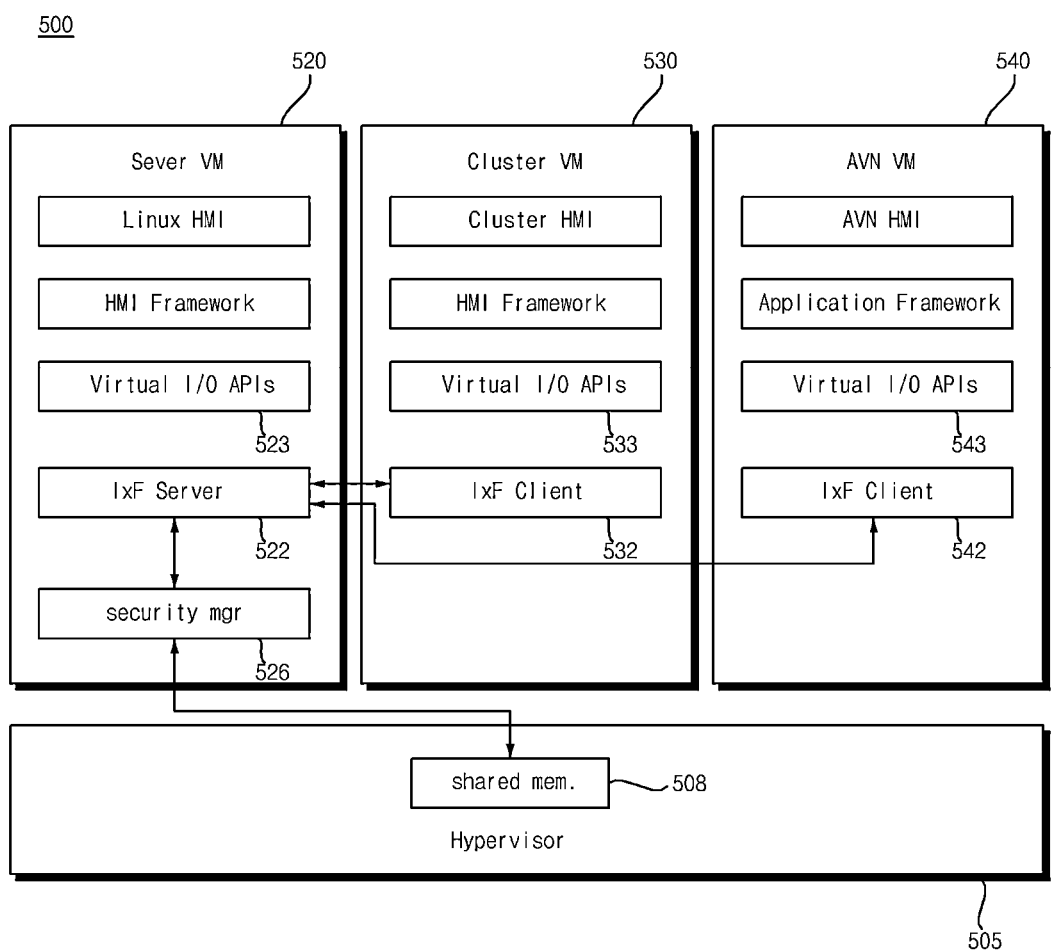
FIGS. 8 to 9B are diagrams referred to in the description of FIG. 5.
Figure 9A:
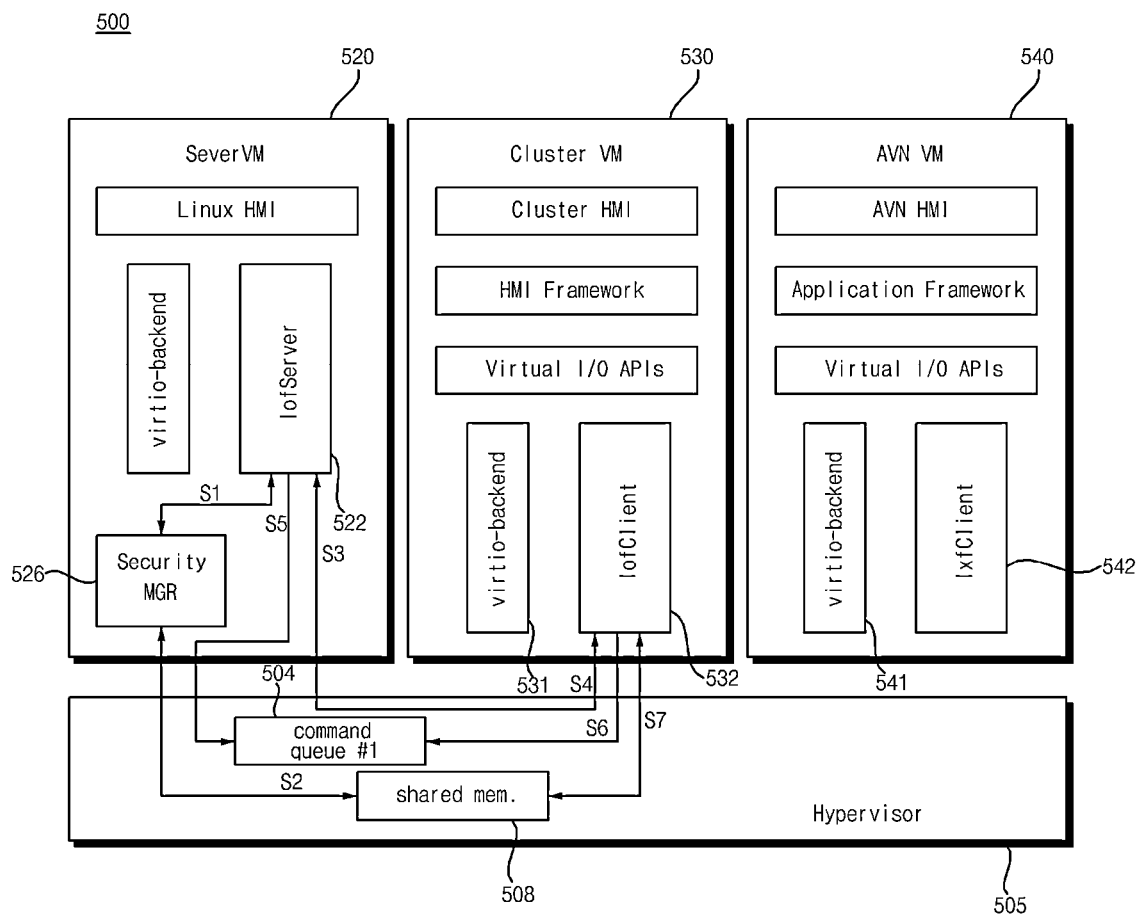
Figure 9B:
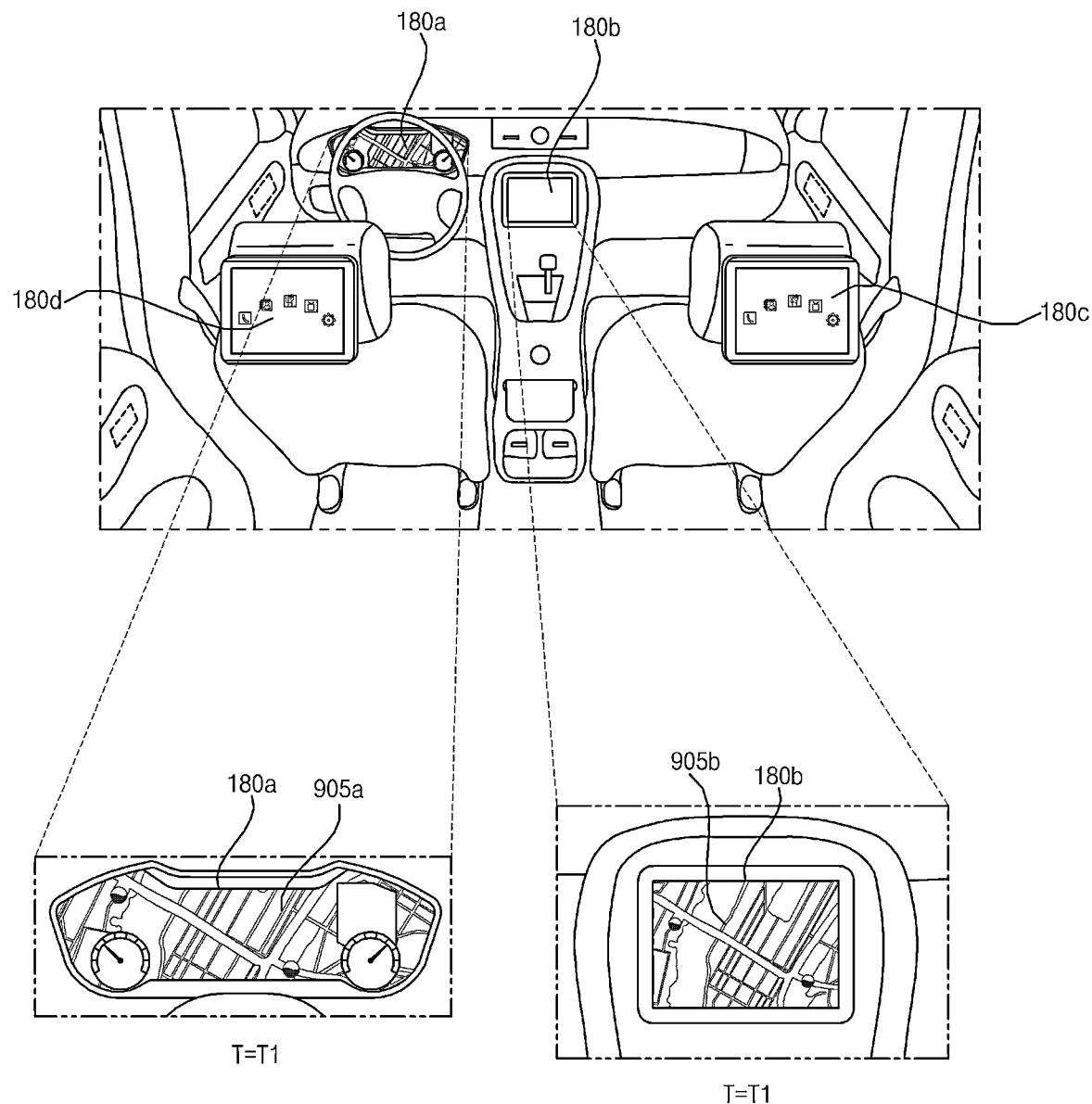

FIGS. 8 to 9B are diagrams referred to in the description of FIG. 5.

First, FIG. 8 illustrates that the first to third virtual machines 520 to 540 are executed on the hypervisor 505 in the processor 175 of the system 500 according to the present disclosure and that the first virtual machine 520 in the processor 175 is configured to the shared memory 508 based on the hypervisor 505 in order to transmit the same data to the second virtual machine 530 and the third virtual machine 540.

Consequently, the plurality of displays 180a and 180b in the vehicle may display the same images in a synchronized state.

Meanwhile, high-speed data communication may be performed between the plurality of virtual machines. Furthermore, high-speed data communication may be performed even though the plurality of virtual machines is executed by different operating systems.

Meanwhile, the first virtual machine 520 in the processor 175 may not allocate memories corresponding in number to the virtual machines but may use a single shared memory 508, not memory allocation in response to transmitting the data processed by the first virtual machine 520 to another virtual machine. Consequently, 1:N data communication using the shared memory 508, not 1:1 data communication, may be performed between the virtual machines.

Meanwhile, the first virtual machine 520 in the processor 175 may include an input and output server interface 522 and a security manager 526.

Meanwhile, the second virtual machine 530 and the third virtual machine 540 may include input and output client interfaces 532 and 542, respectively. Consequently, high-speed data communication between the plurality of virtual machines may be performed using the input and output server interface 522 and the input and output client interfaces 532 and 542.

The input and output server interface 522 in the first virtual machine 520 may receive requests for transmission of the same data from the input and output client interfaces 532 and 542 in the second virtual machine 530 and the third virtual machine 540, and may transmit shared data to the shared memory 508 through the security manager 526 based thereon.

FIG. 9A is a view illustrating transmission of shared data in more detail.

Referring to the figure, in order to transmit shared data, the input and output server interface 522 in the first virtual machine 520 transmits a request for allocation of the shared memory 508 to the security manager 526 (S1).

Subsequently, the security manager 526 may allocate the shared memory 508 using the hypervisor 505 (S2), and may write shared data in the shared memory 508.

Meanwhile, the input and output client interfaces 532 and 542 may transmit a request for connection to the input and output server interface 522 after allocation of the shared memory 508 (S3).

Meanwhile, the input and output server interface 522 transmits information regarding the shared memory 508 including key data to the input and output client interfaces 532 and 542 after allocation of the shared memory 508 (S4). At this time, the key data may be private key data for data access.

Meanwhile, the first virtual machine 520 in the processor 175 may transmit information regarding the shared memory 508 to the second virtual machine 530 and the third virtual machine 540 after setting of the shared memory 508.

Subsequently, the input and output server interface 522 in the first virtual machine 520 is configured to generate a command or a command queue for event processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue may be generated in the first virtual machine 520, not the hypervisor 505, under control of the input and output server interface 522.

Subsequently, the input and output client interfaces 532 and 542 access the command queue buffer 504 to receive the generated command queue or information regarding the command queue (S6).

For example, in response to the commands transmitted to the input and output client interfaces 532 and 542 being the same, the generated command queues may be the same.

As another example, in response to the commands transmitted to the input and output client interfaces 532 and 542 being different from each other, different command queues may be transmitted to the input and output client interfaces 532 and 542.

Subsequently, the input and output client interfaces 532 and 542 may access the shared memory 508 based on the received key data (S5), and may copy or read the shared data from the shared memory 508 (S7).

Particularly, in response to the input and output client interfaces 532 and 542 receiving the same shared data, the input and output client interfaces 532 and 542 may access the shared memory 508 based on the same command queues and the same key data (S5), and may copy or read the shared data from the shared memory 508.

Consequently, the second virtual machine 530 and the third virtual machine 540 may access the shared memory 508, and may eventually share the shared data.

For example, in the case in which the shared data are image data, the second virtual machine 530 and the third virtual machine 540 may share the image data, and eventually the plurality of displays 180*a* and 180*b* in the vehicle may display the same shared images in a synchronized state.

FIG. 9B illustrates that, by the system 500 of FIG. 9A, the second virtual machine 530 displays image data received through the shared memory 508 on the first display 180*a*, and the third virtual machine 540 displays image data received through the shared memory 508 on the second display 180*b*.

FIG. 9B illustrates that an image 905*a* displayed on the first display 180*a* and an image 905*b* displayed on the second display 180*b* are synchronized, whereby the same images 905*a* and 905*b* are displayed at the time of T1.

That is, image data processed by the first virtual machine 520 in the processor 175 are transmitted to the second virtual machine 530 and the third virtual machine 540 through the shared memory 508, and the first image 905*a* displayed on the first display 180*a* and the second image 905*b* displayed on the second display 180*b* based on the image data may be the same. Consequently, the plurality of displays 180*a* and 180*b* in the vehicle may display the same images in a synchronized state.

Figure 10:
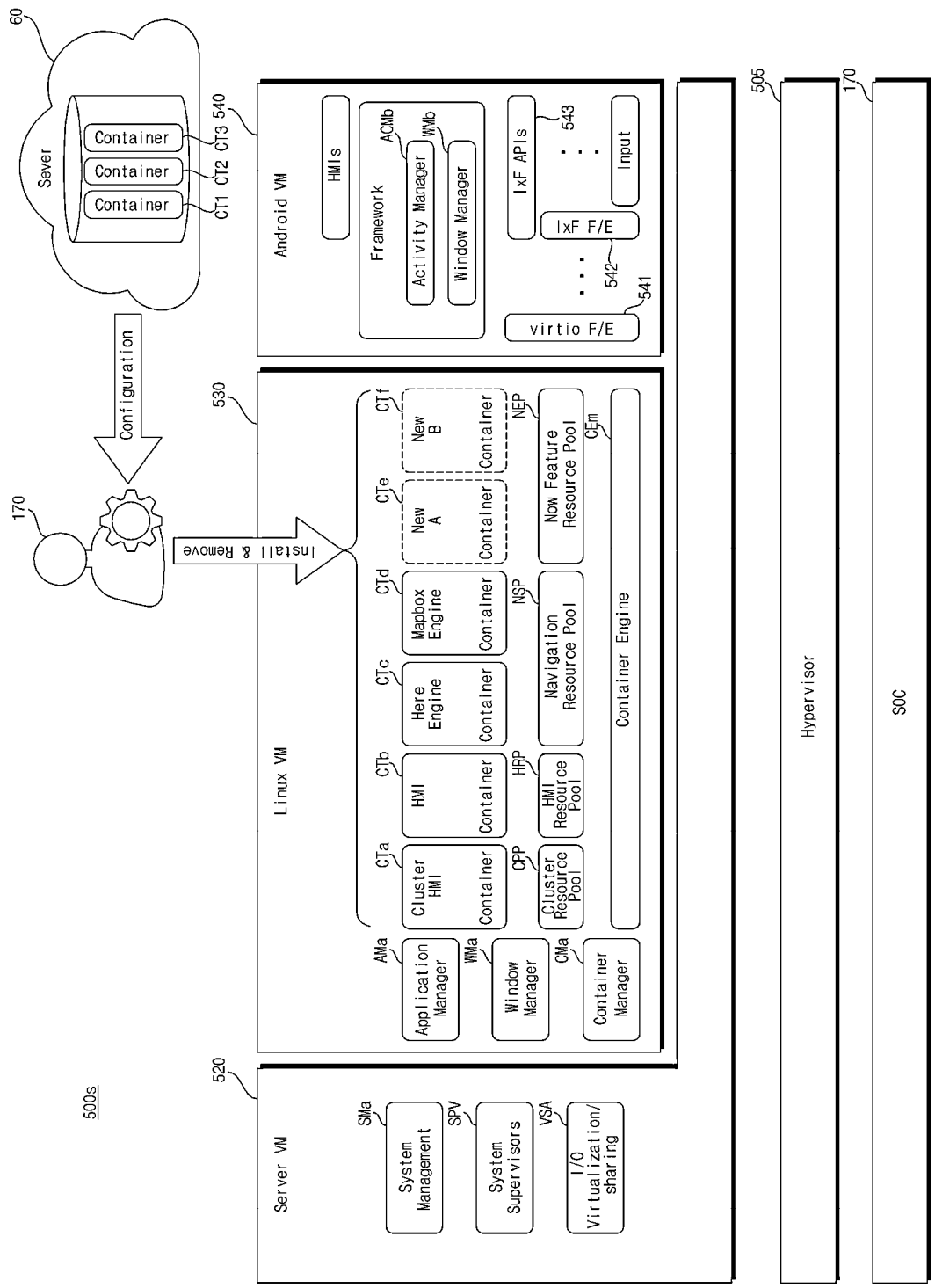
FIG. 10 is a diagram illustrating a system executed in a signal processing device according to an embodiment of the present disclosure.

FIG. 10 is a diagram illustrating a system executed in a signal processing device according to an embodiment of the present disclosure.

Referring to the drawing, a system 500*s* executed in the signal processing device 170 according to an embodiment of the present disclosure may execute the first to third virtual machines 520, 530, and 540.

Particularly, the system 500*s* executed in the signal processing device 170 according to an embodiment of the present disclosure may execute the first to third virtual machines 520, 530, and 540 on the hypervisor 505 in the processor 175.

The first virtual machine 520, which is a server virtual machine, may execute system management SMa for overall system control, system supervisors SPV for overall system management, and input/output (I/O) virtualization VSA.

Meanwhile, the I/O virtualization VSA may correspond to the input and output server interface 522 of FIG. 5 and the like.

The second virtual machine 530, which is a guest virtual machine, may operate on the Linux Operating System (OS), and may execute at least one container for application execution.

In the drawing, an example of executing a plurality of containers is illustrated, and more specifically, an example is illustrated in which the second virtual machine 530 includes a cluster HMI cluster CTa, an HMI cluster CTb, a Here Engine cluster CTc related to a digital map, a map box engine cluster CTd, a first new cluster CTe, and a second new cluster CTf.

The cluster HMI cluster CTa may execute on a cluster resource pool CPP, the HMI cluster CTb may execute on an HMI resource pool HRP, the Here Engine cluster CTc and the map box engine cluster CTd may execute on a navigation resource pool NSP, and the first new cluster CTe and the second new cluster CTf may execute on a new feature resource pool NEP.

Meanwhile, the second virtual machine 530, which is a guest virtual machine, may execute a container engine CEm, and may execute at least one container CTe to CTf on the container engine CEm.

Particularly, the second virtual machine 530, which is a guest virtual machine, may execute the container engine CEm, may execute at least one resource pool CPP, HRP, NSP, and NEP on the container engine CEm, and may execute at least one container CTe to CTf on at least one resource pool CPP, HRP, NSP, and NEP.

Meanwhile, the second virtual machine 530, which is a guest virtual machine, may execute a container manager CMa for managing the container engine CEm or at least one container CTe to CTf.

Meanwhile, the second virtual machine 530, which is a guest virtual machine, may execute a window manager WMa for window management.

Meanwhile, the second virtual machine 530, which is a guest virtual machine, may execute an application manager AMa for application management.

Meanwhile, unlike the second virtual machine 530, the third virtual machine 540 which is a guest virtual machine may execute on the Android operating system, and in order to execute applications, the third virtual machine 540 may execute a physical device driver 541, the input and output client interface 542, APIs 543 for controlling the input and output client interface 542, framework including an activity manager ACMb and a window manager WMb, HMI, and the like.

Meanwhile, at least one container in the second virtual machine 530 may be any one which is selected from among a plurality of containers CT1 to CT3 in the server 60, to be installed and executed.

During deployment, installation, and execution of the containers, the deployment, installation, and execution of each of the containers result in significant data consumption and resource consumption. Particularly, as the number of containers installed increases, the data consumption and resource consumption increase significantly.

Accordingly, embodiments of the present disclosure propose a method of efficiently installing and executing a container, which will be described below with reference to FIG. 11 and subsequent figures.

Figure 11:
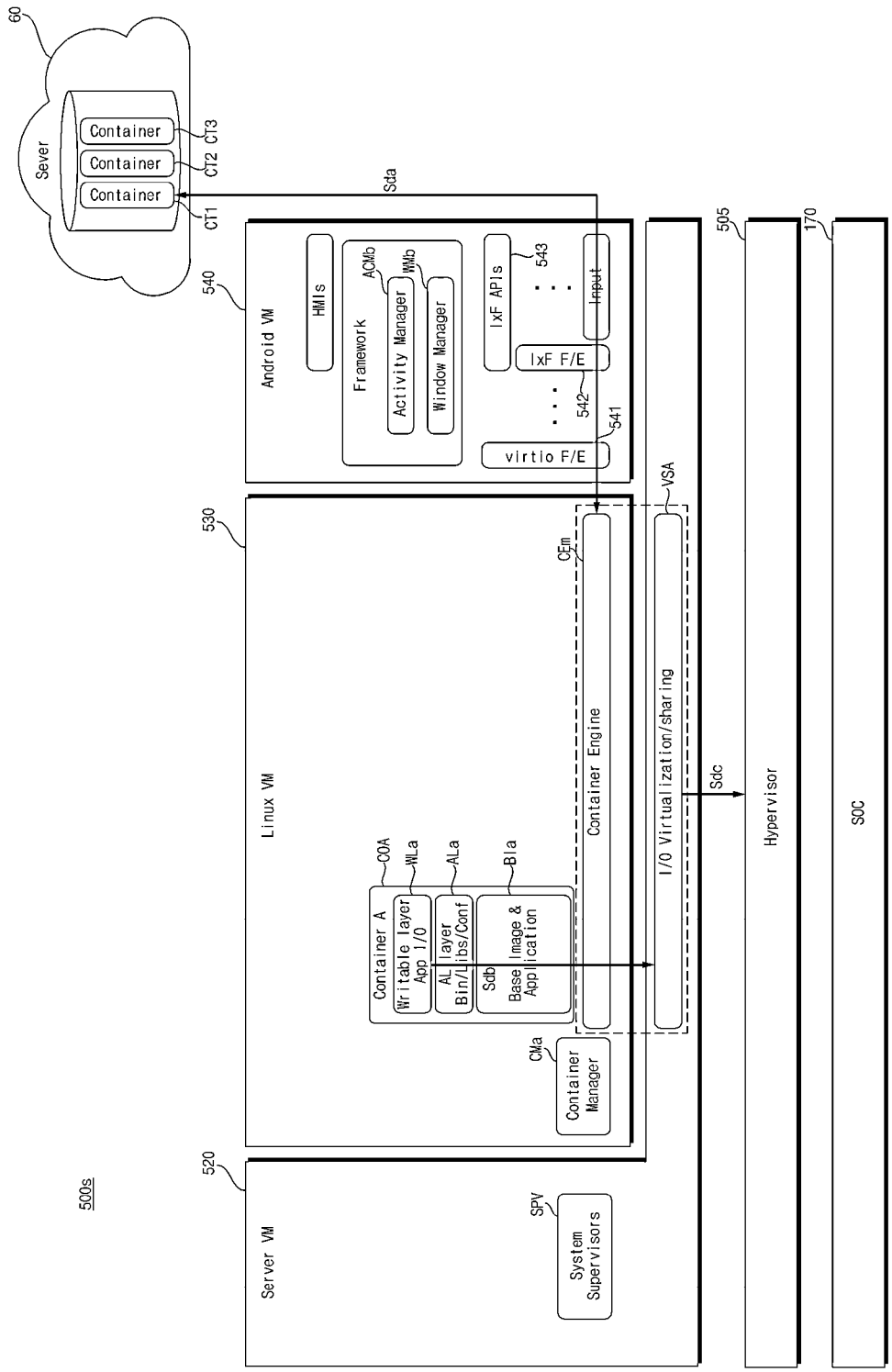
FIGS. 11 to 17B are diagrams referred to in the description of FIG. 10.

FIG. 11 is a diagram illustrating an example of installing and executing a container in the second virtual machine 530 of FIG. 10.

Referring to the drawing, the system 500s executed in the signal processing device 170 according to an embodiment of the present disclosure may execute the first to third virtual machines 520, 530, and 540.

The first virtual machine 520, which is a server virtual machine, may execute system supervisors SPV for overall system management and input/output (I/O) virtualization VSA. Meanwhile, the I/O virtualization VSA may correspond to the input and output server interface 522 of FIG. 5 and the like.

The second virtual machine 530, which is a guest virtual machine, may operate on the Linux Operating System (OS), and may execute a container COA for application execution.

Meanwhile, the second virtual machine 530, which is a guest virtual machine, may execute a container engine CEm, and may execute the container COA on the container engine CEm.

Meanwhile, the second virtual machine 530, which is a guest virtual machine, may execute a container manager CMa for managing the container COA.

Meanwhile, unlike the second virtual machine 530, the third virtual machine 540 which is a guest virtual machine may execute on the Android operating system, and in order to execute applications, the third virtual machine 540 may execute the input and output client interface 542, APIs 543 for controlling the input and output client interface 542, framework including an activity manager ACMb and a window manager WMb, HMI, and the like.

Meanwhile, the container COA in the second virtual machine 530 may be any one which is selected from among a plurality of containers CT1 to CT3 in the server 60, to be installed and executed.

Meanwhile, the second virtual machine 530 according to an embodiment of the present disclosure executes at least one container COA that is executed on the container engine CEm, and the container COA includes an abstraction layer ALa that varies based on platforms, operating systems, or executed applications.

As the abstraction layer ALa varies based on platforms, operating systems, or executed applications, various arrangements may be provided for each platform, operating system, or application, and the abstraction layer may be simply configured based on circumstances.

Accordingly, the container COA may be efficiently installed and executed. Particularly, the container COA may be efficiently installed and executed based on platforms, operating systems, or executed applications. In addition, a storage space required for installing the container COA may be minimized.

Meanwhile, the abstraction layer ALa in the container COA may include binary, library, and configuration files that are required for applications. Accordingly, the container COA may be efficiently installed and executed.

Meanwhile, the abstraction layer ALa in the container COA may include binary, library, and configuration files related to platform, binary, library, and configuration files related to application, and binary and library files for executing the container COA. Accordingly, the container COA may be efficiently installed and executed.

Meanwhile, in order to generate another container COA, the processor 175 may share and transmit some of the binary, framework, library, and configuration files, which are required for application execution, in the abstraction layer ALa of the container COA. Accordingly, the container COA may be efficiently installed and executed. In addition, a storage space required for installing the container COA may be minimized.

Meanwhile, the second virtual machine 530 and the third virtual machine 540 may execute on different operating systems. Accordingly, the container COA may be efficiently installed and executed even when operating systems of a plurality of virtual machines are different from each other.

Meanwhile, the processor 175 may download a service container from the server 60 (SDa). In the drawing, an example is illustrated in which the downloaded service container is sent to the container engine CEm executed in the processor 175.

Meanwhile, the processor 175 may generate an abstraction layer ALa based on the downloaded service container. In the drawing, an abstraction layer ALa including binary, library, and configuration files is illustrated.

The abstraction layer ALa is an additional layer that is added according to an embodiment of the present disclosure and may be added on a base image layer Bla. In addition, a writable layer WLa may be generated on the abstraction layer ALa.

That is, the container COA may include the base image layer Bla, the abstraction layer ALa on the base image layer Bla, and the writable layer WLa on the abstraction layer ALa.

Meanwhile, the processor 175 executes the container COA on the container engine CEm, and the executed container engine CEm may correspond to the input/output (I/O) virtualization VSA, executed by the first virtual machine 520, or the input and output server interface 522 (Sdc).

That is, the processor 175 may execute the container engine CEm in the second virtual machine 530 and may execute the container COA on the container engine CEm. Accordingly, the container COA may be efficiently installed and executed.

Meanwhile, unlike FIG. 11, the processor 175 in the signal processing device 170 according to another embodiment of the present disclosure may execute the first virtual machine 520 and the second virtual machine 530 except the third virtual machine 540, in which the first virtual machine 520 operates as a server virtual machine and the second virtual machine operates as a guest virtual machine, and the second virtual machine 530 executes at least one container COA that is executed on the container engine CEm, and the container COA includes the abstraction layer ALa that varies based on platforms, operating systems, or executed applications.

Accordingly, the container COA may be efficiently installed and executed. Particularly, the container COA may be efficiently installed and executed based on platforms, operating systems, or executed applications. In addition, a storage space required for installing the container COA may be minimized.

Figure 12:
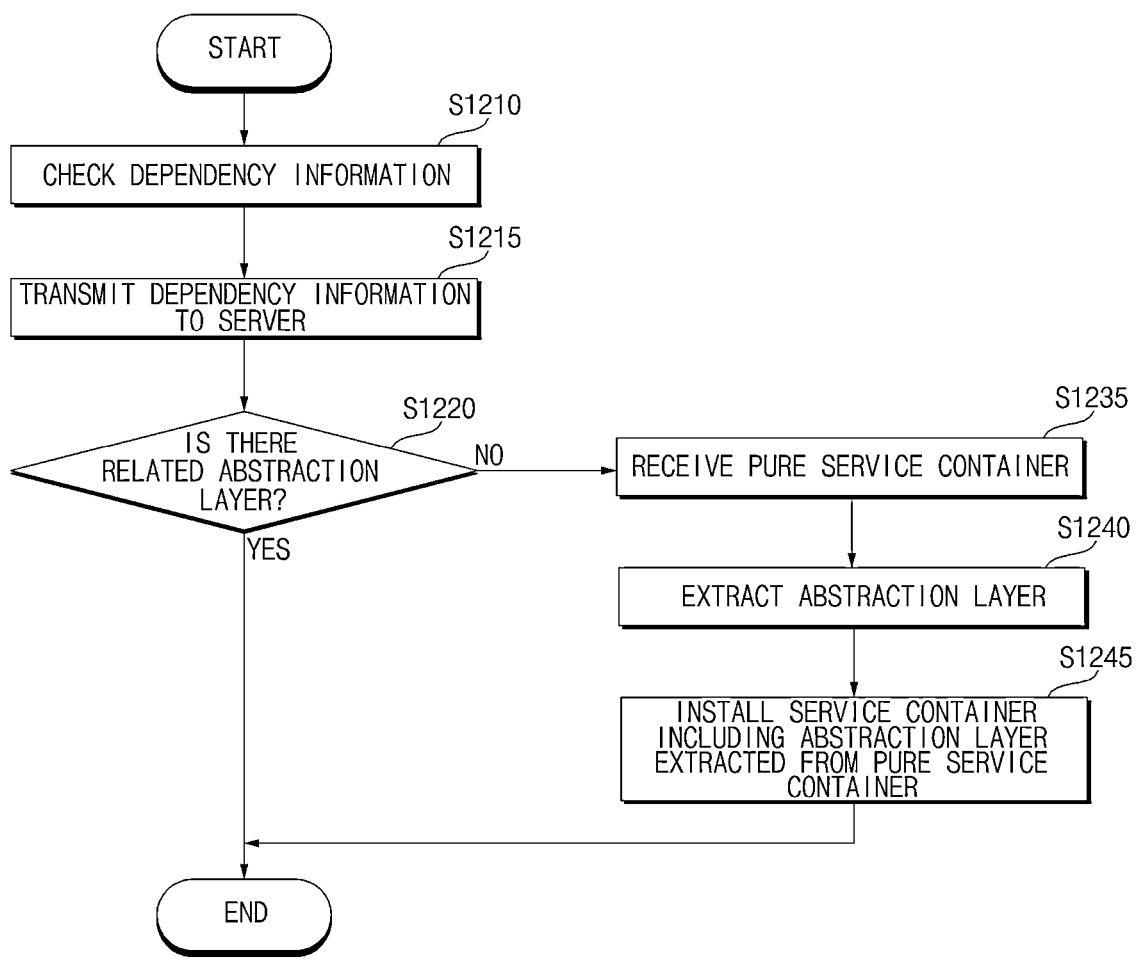
Figure 13:
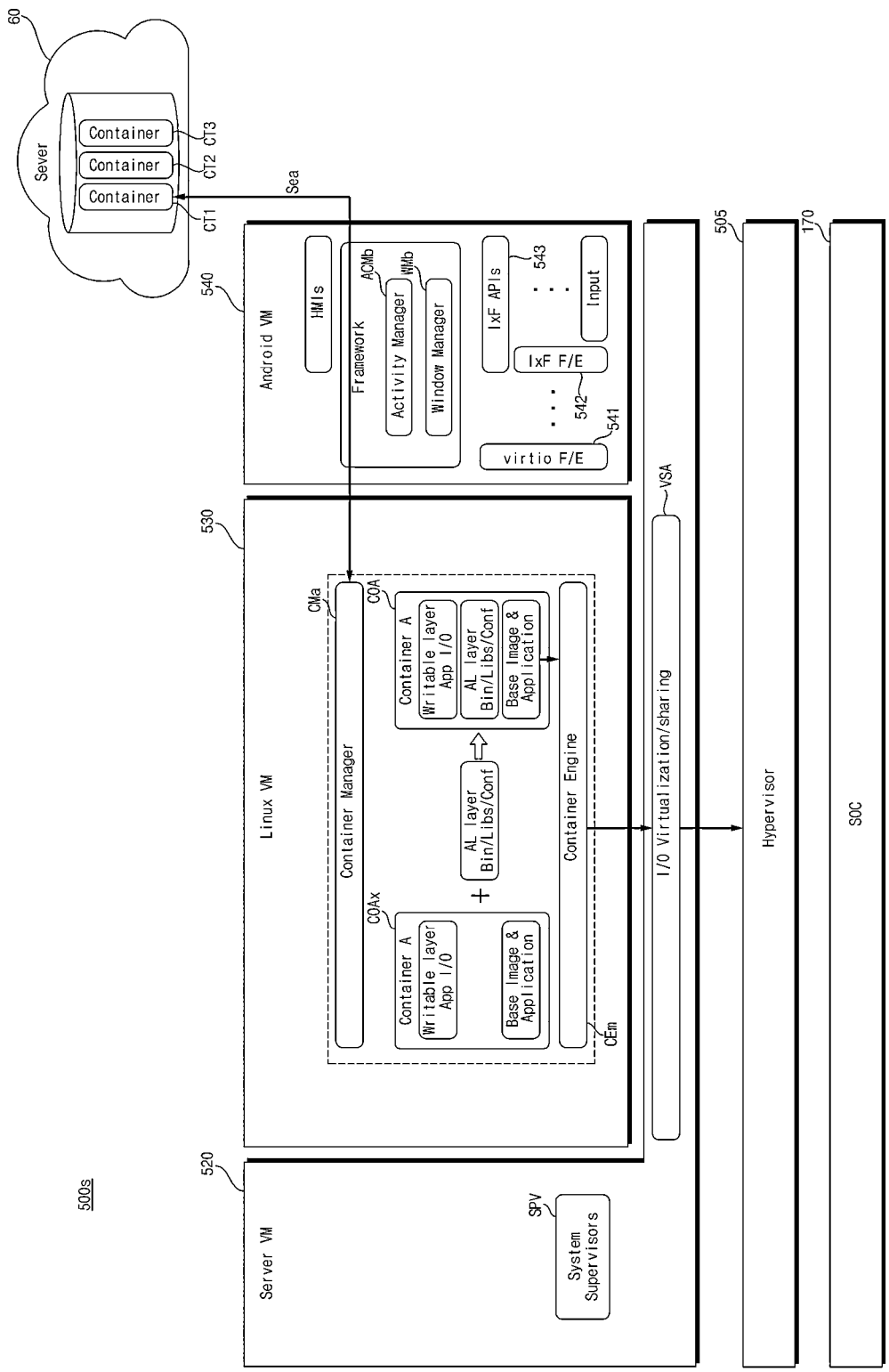

FIG. 12 is a flowchart illustrating operation of a signal processing device 170 according to an embodiment of the present disclosure, and FIG. 13 is a diagram referred to in the description of FIG. 12.

Referring to the drawing, a container manager CMa in the second virtual machine 530 executed in the processor 170 checks dependency information (S1210).

Meanwhile, the container manager CMa in the second virtual machine 530 executed in the processor 170 may check platform or model dependency information via the first virtual machine 520 which is the server virtual machine.

Here, the platform may refer to the type, shape, and the like of the signal processing device 170.

Then, the container manager CMa in the second virtual machine 530 executed in the processor 170 transmits the dependency information to the server 60 (S1215).

For example, the container manager CMa in the second virtual machine 530 may transmit the dependency information to the server 60 through the transceiver 120.

Next, the container manager CMa in the second virtual machine 530 executed in the processor 170 determines whether there is an abstraction layer (S1220).

FIG. 13 illustrates an example in which a first container COAx includes only a base image layer and a writable layer on the base image layer, with no abstraction layer included therein.

As illustrated in FIG. 13, if no abstraction layer is included in the first container COAx, the container manager CMa in the second virtual machine 530 executed in the processor 170 receives a pure service container Sea from the server 60 (S1235), and extracts an abstraction layer from the received pure service container (S1240).

The extracted abstraction layer ALa may include binary, library, and configuration files required for an application.

Then, as illustrated in FIG. 13, the container manager CMa in the second virtual machine 530 executed in the processor 170 may install the service container COA including the extracted abstraction layer ALa (S1245).

Accordingly, by adding the abstraction layer ALa to the existing first container COAx, a new container COA may be efficiently installed and executed.

Particularly, by reusing the existing first container COAx, the container COA may be efficiently installed and executed. In addition, a storage space required for installing the container COA may be minimized.

Meanwhile, the processor 175 may configure the abstraction layer ALa based on system information from the first virtual machine 520 and binary, library, and configuration files in the second virtual machine 530, in addition to information from the server 60. Accordingly, the container COA may be efficiently installed and executed.

Meanwhile, the processor 175 may download a service container from the server 60 and may reassemble the abstraction layer ALa based on platforms, which will be described below with reference to FIG. 14.

Figure 14:
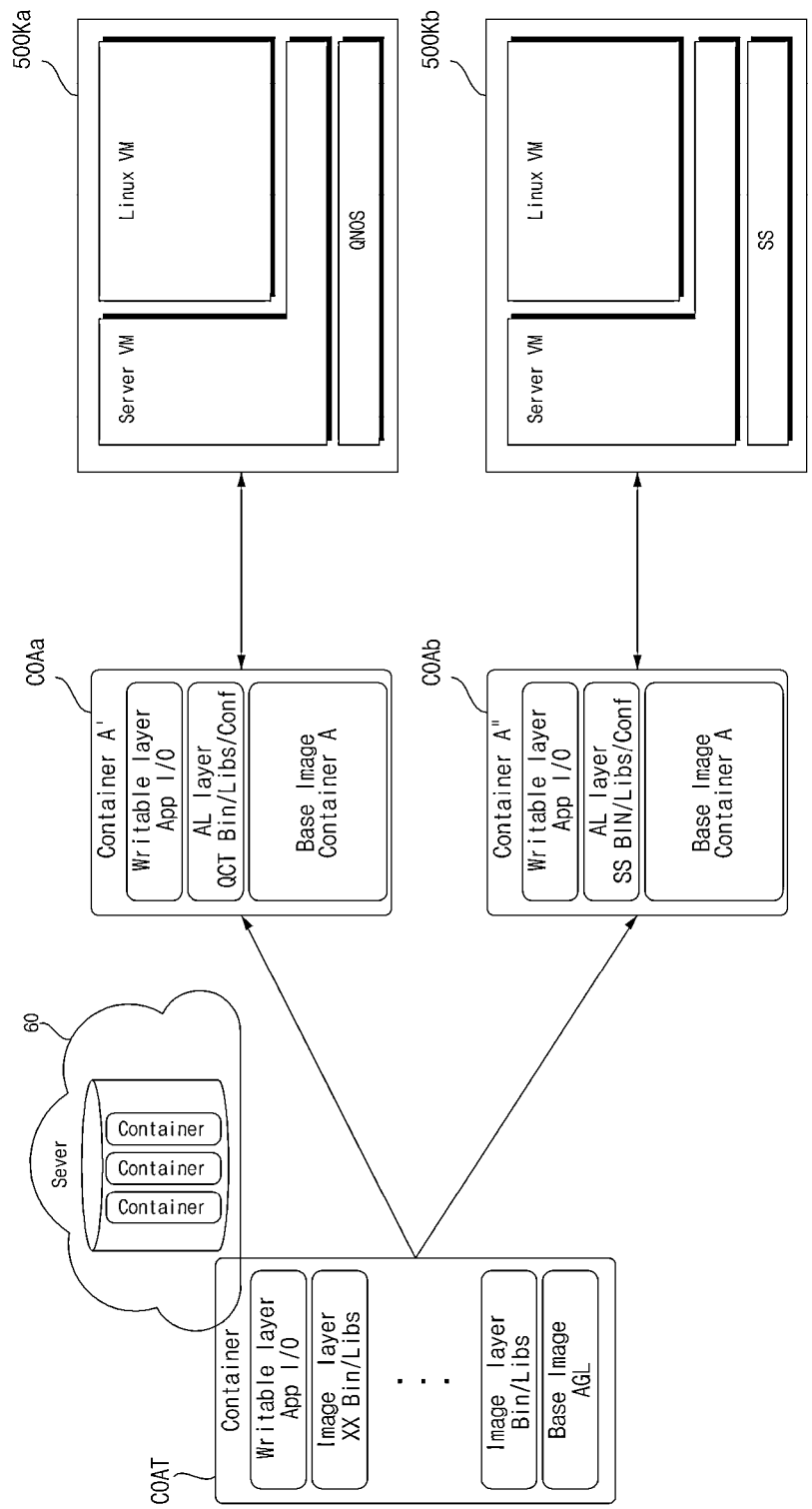

FIG. 14 is a diagram illustrating an example of installing containers COAa and COAb in different platforms.

Referring to the drawing, upon receiving a service container COAT from the server 60, the processor 175 may reassemble the abstraction layer ALa based on platforms.

For example, as illustrated herein, if the container is installed in a first platform 500Ka, the processor 175 may be configured to install the first container COAa including a first abstraction layer ALa.

In this case, the first abstraction layer ALa may include binary, library, and configuration files based on the first platform.

In another example, as illustrated herein, if the container is installed in a second platform 500Kb, the processor 175 may be configured to install the second container COAb including a second abstraction layer ALa.

In this case, the second abstraction layer ALa may include binary, library, and configuration files based on the second platform.

That is, when the container is executed in the second virtual machine 530 based on the first platform 500Ka, the container COA may include the first abstraction layer ALa, and when the container is executed in the second virtual machine 530 based on the second platform 500Kb different from the first platform, the container COA may include the second abstraction layer ALa which is different from the first abstraction layer ALa. Accordingly, the container COA may be efficiently installed and executed based on the platforms.

Similarly, if the container is installed in the second virtual machine 530 that executes on a first operating system, the processor 175 may be configured to install the first container COAa including the first abstraction layer ALa.

In this case, the first abstraction layer ALa may include binary, library, and configuration files based on the first operating system.

In another example, if the container is installed in the second virtual machine 530 that executes on a second operating system, the processor 175 may be configured to install the second container COAb including the second abstraction layer ALa.

In this case, the second abstraction layer ALa may include binary, library, and configuration files based on the second operating system.

That is, when the container is executed in the second virtual machine 530 based on the first operating system, the container COA may include the first abstraction layer ALa, and when the container is executed in the second virtual machine 530 based on the second operating system different from the first operating system, the container COA may include the second abstraction layer ALa which is different from the first abstraction layer ALa. Accordingly, the container COA may be efficiently installed and executed based on the operating systems.

Meanwhile, if the container is installed in the second virtual machine 30 for a first application, the processor 175 may be configured to install the first container COAa including the first abstraction layer ALa.

In this case, the first abstraction layer ALa may include binary, library, and configuration files for the first application.

In another example, if the container is installed in the second virtual machine 530 for a second application, the processor 175 may be configured to install the second container COAb including the second abstraction layer ALa.

In this case, the second abstraction layer ALa may include binary, library, and configuration files for the second application.

Meanwhile, when the container is executed in the second virtual machine 530 for the first application, the container COA may include the first abstraction layer ALa, and when the container is executed in the second virtual machine 530 for the second application different from the first application, the container COA may include the second abstraction layer ALa which is different from the first abstraction layer ALa. Accordingly, the container COA may be efficiently installed and executed based on the executed applications.

Figure 15:
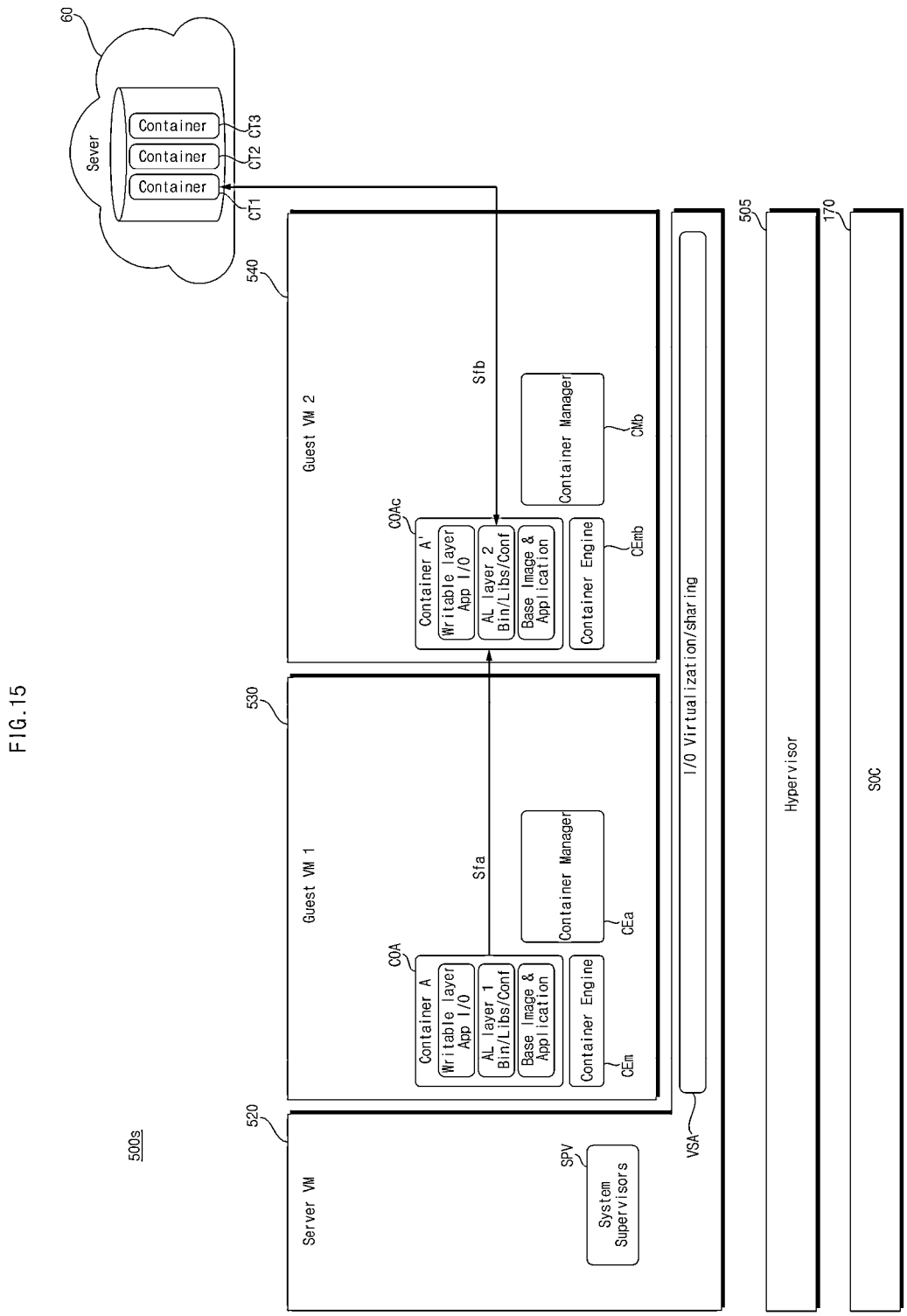

FIG. 15 is a diagram explaining movement of a container.

Referring to the drawing, in order to move the first container COA in the second virtual machine 530 to the third virtual machine 540 among the first to third virtual machines 520 to 540 executed in the signal processing device 170, the second virtual machine 530 first transmits container-related information to the third virtual machine 540 (Sfa).

In this case, the container-related information may be information related to the service container, except the abstraction layer ALa in the second virtual machine 530.

That is, the processor 175 may transmit the service container, except the abstraction layer ALa in the second virtual machine 530, to the third virtual machine 540.

Then, the third virtual machine 540 may receive information about the second abstraction layer from the server 60.

Further, the third virtual machine 540 may generate a second container COAc in the third virtual machine 540 based on the information related to the service container which is received from the second virtual machine 530 and the information about the second abstraction layer which is received from the server 60.

Accordingly, the second container COAc may be efficiently installed and executed in the third virtual machine 540. Further, by receiving the information about the second abstraction layer from the server 60, a storage space required for installing the second container COAc may be minimized.

Figure 16A:
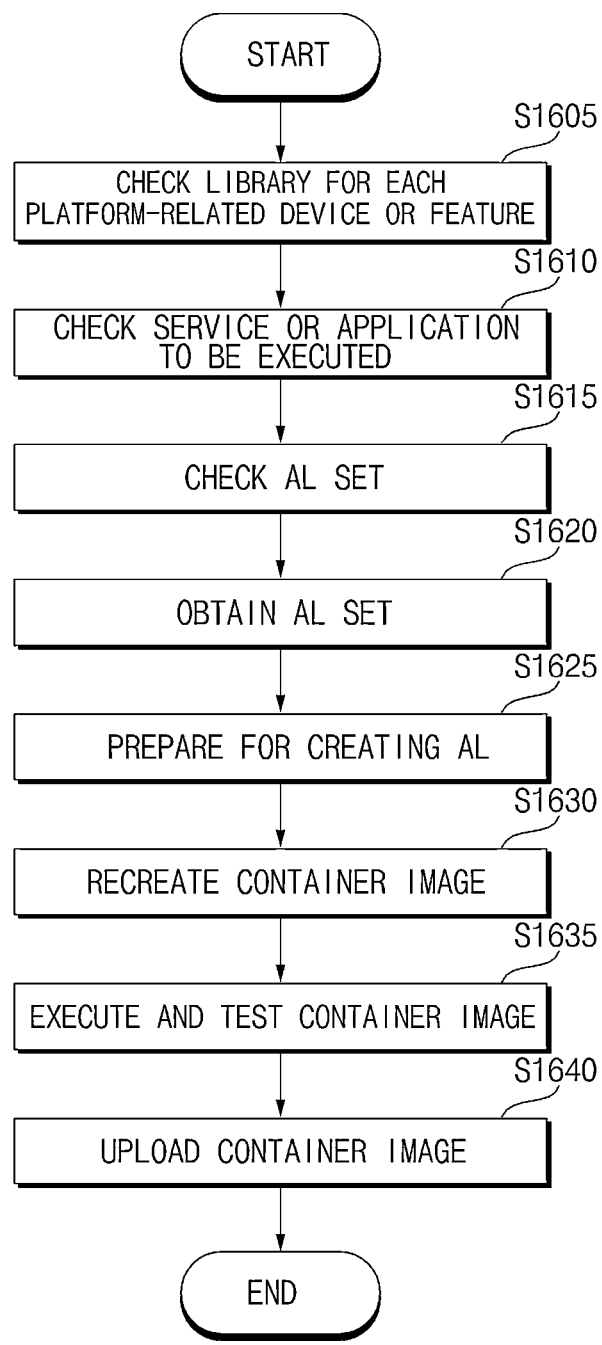
Figure 16B:
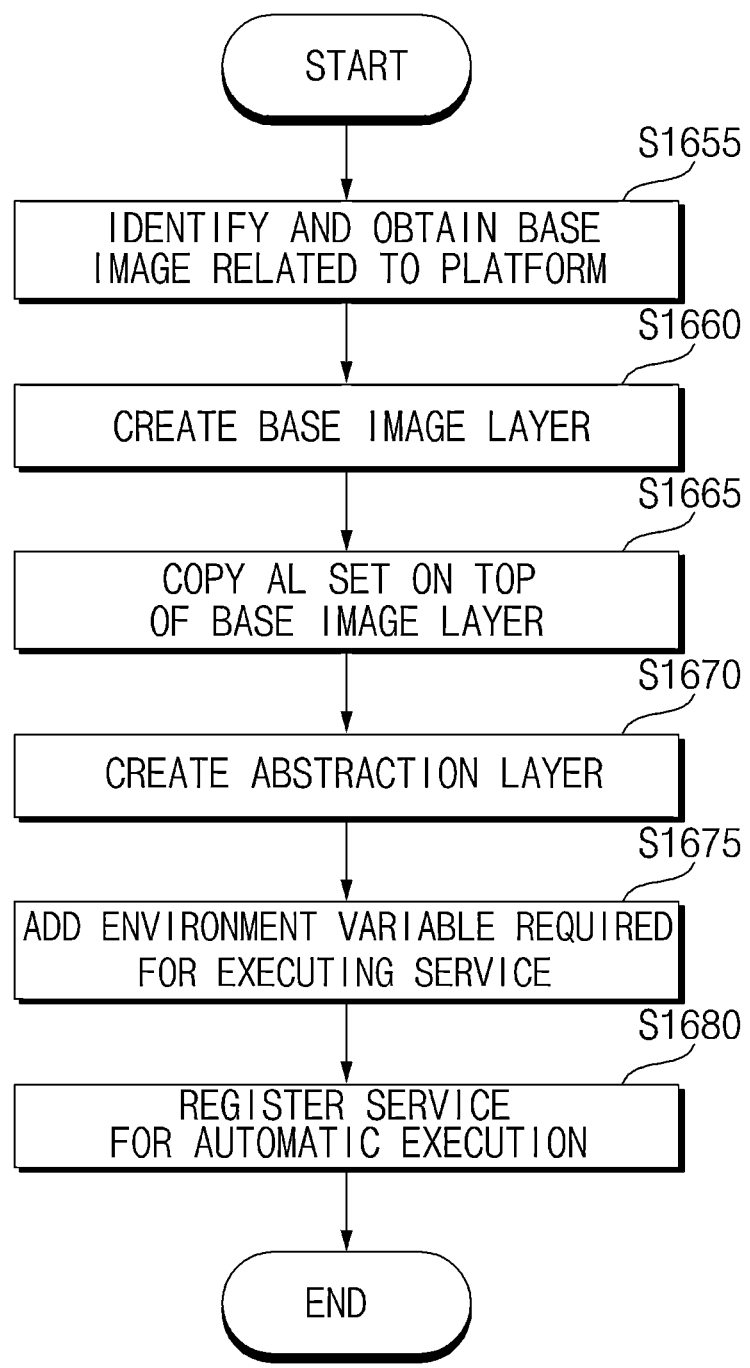

FIGS. 16A and 16B are flowcharts referred to for generating an abstraction layer.

First, referring to FIG. 16A, the processor 175 in the signal processing device 170 checks a library for each platform-related device or feature (S1605).

For example, the processor 175 in the signal processing device 170 may check a library for each screen, video, audio, Wi-Fi, network, and Bluetooth.

Then, the processor 175 in the signal processing device 170 checks a service or application to be executed in the container (S1610).

Subsequently, the processor 175 in the signal processing device 170 checks an abstraction layer set required for executing a service container (S1615).

For example, the processor 175 in the signal processing device 170 may check binary, framework, library, and configuration files required for executing a service container or an application, a framework path, and the like.

Next, the processor 175 in the signal processing device 170 obtains the abstraction layer set (S1620).

For example, the processor 175 in the signal processing device 170 may check environment variables and a path setup for identifying and obtaining a file tree structure.

Then, the processor 175 in the signal processing device 170 prepares for generating the abstraction layer set (S1625).

For example, the processor 175 in the signal processing device 170 may generate the abstraction layer by combining a set related to platform, a set related to an executed service, and a set related to framework.

In another example, the processor 175 in the signal processing device 170 may generate an abstraction layer including binary, library, and configuration files related to platform, binary, library, and configuration files related to application, and binary and library files for executing the container COA.

Then, the processor 175 in the signal processing device 170 may regenerate a container image (S1630).

The processor 175 in the signal processing device 170 may generate a container image including the abstraction layer generated in operation 1625 (S1625).

For example, if an existing container image includes only a base image layer and a writable layer, the processor 175 in the signal processing device 170 adds the abstraction layer generated in operation 1625 (S1625), to regenerate a container image including the base image layer, the writable layer, and the abstraction layer.

Then, the processor 175 in the signal processing device 170 may execute and test the generated container image (S1635) Further, if the image is executed normally, the processor 175 in the signal processing device 170 may upload the container image so that the image may be executed on the second virtual machine (S1640).

FIG. 16B is a flowchart illustrating in further detail operation 1630 (S1630) of regenerating the container image of FIG. 16A.

Referring to the drawing, the processor 175 in the signal processing device 170 identifies and obtains a base image related to platform (S1655).

Then, the processor 175 in the signal processing device 170 generates a base image layer based on the obtained base image related to platform (S1660).

Subsequently, the processor 175 in the signal processing device 170 copies an abstraction layer set on the base image layer (S1665).

Next, the processor 175 in the signal processing device 170 generates an abstraction layer on the base image layer based on the copied abstraction layer set (S1670).

Then, the processor 175 in the signal processing device 170 generates a writable layer on the abstraction layer.

Subsequently, the processor 175 in the signal processing device 170 adds an environment variable required for executing a service or application (S1675).

Next, the processor 175 in the signal processing device 170 registers a service for automatic execution (S1680).

Accordingly, the processor 175 in the signal processing device 170 may efficiently install and execute the container COA including the base image layer Bla, the abstraction layer ALa on the base image layer Bla, and the writable layer WLa on the abstraction layer ALa.

Figure 17A:
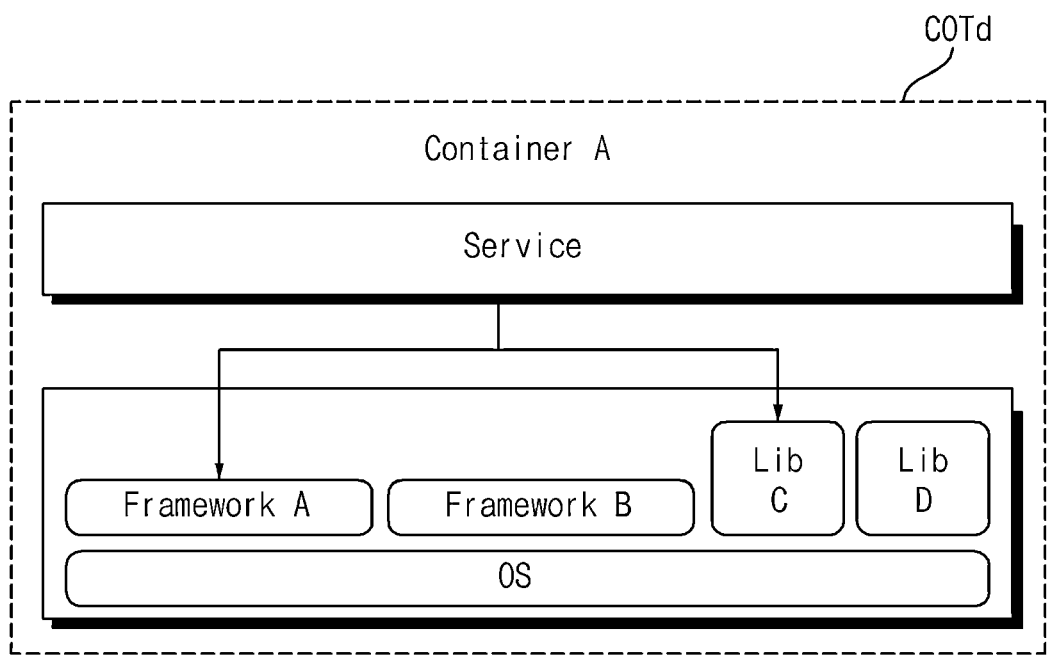
Figure 17B:
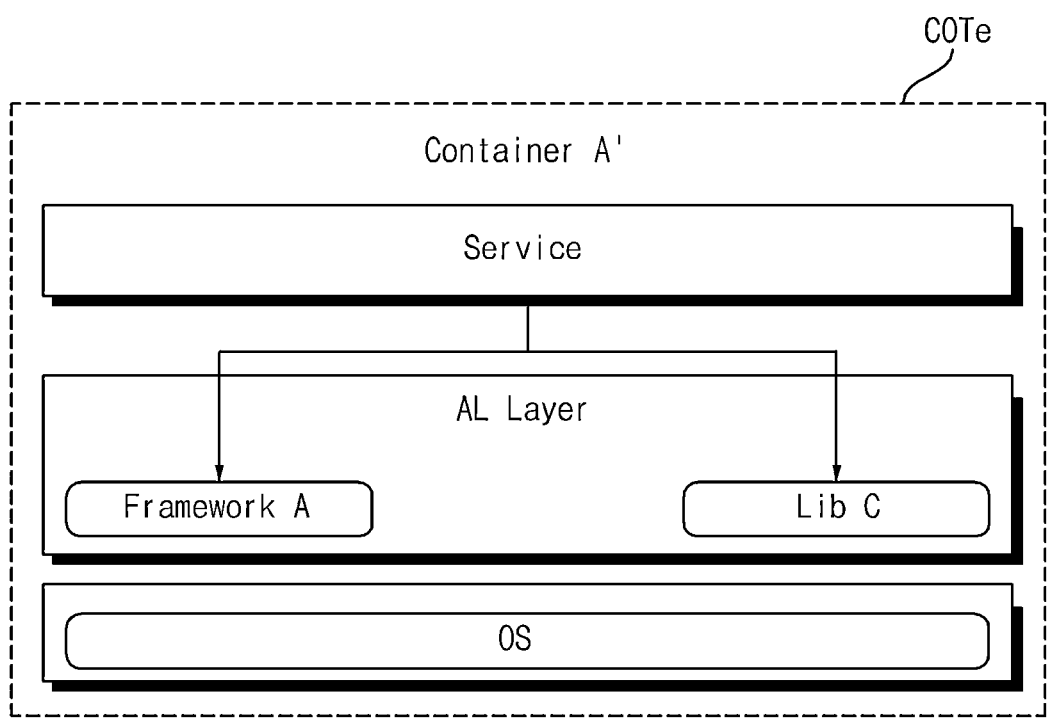

FIG. 17A is a diagram illustrating a container including no abstraction layer, and FIG. 17B is a diagram illustrating a container including an abstraction layer.

As illustrated in FIG. 17A, if a container COTd includes a service and an image layer with no abstraction layer included therein, the image layer is required to include all of information related to first framework framework A, information related to second framework framework B, information related to third library Lib C, information related to fourth library Lib D, etc., thereby resulting in an inefficient use of resources.

However, as illustrated in FIG. 17B, if a container COTe according to an embodiment of the present disclosure includes an abstraction layer, the abstraction layer includes only the information related to the first framework framework A and the information related to the third library Lib C, which are essential for executing a service or application, without including the information related to the second framework framework B and the information related to the fourth library Lib D, thereby allowing an efficient use of resources.

FIGS. 10 to 17B illustrate an example of installing and executing the container in the second virtual machine 530, which is a guest virtual machine, among the first to third virtual machines 520 to 540, but unlike the example, the container may also be installed and executed in the first virtual machine 520 which is a server virtual machine, which will be described below with reference to FIG. 18 and subsequent figures.

Figure 18:
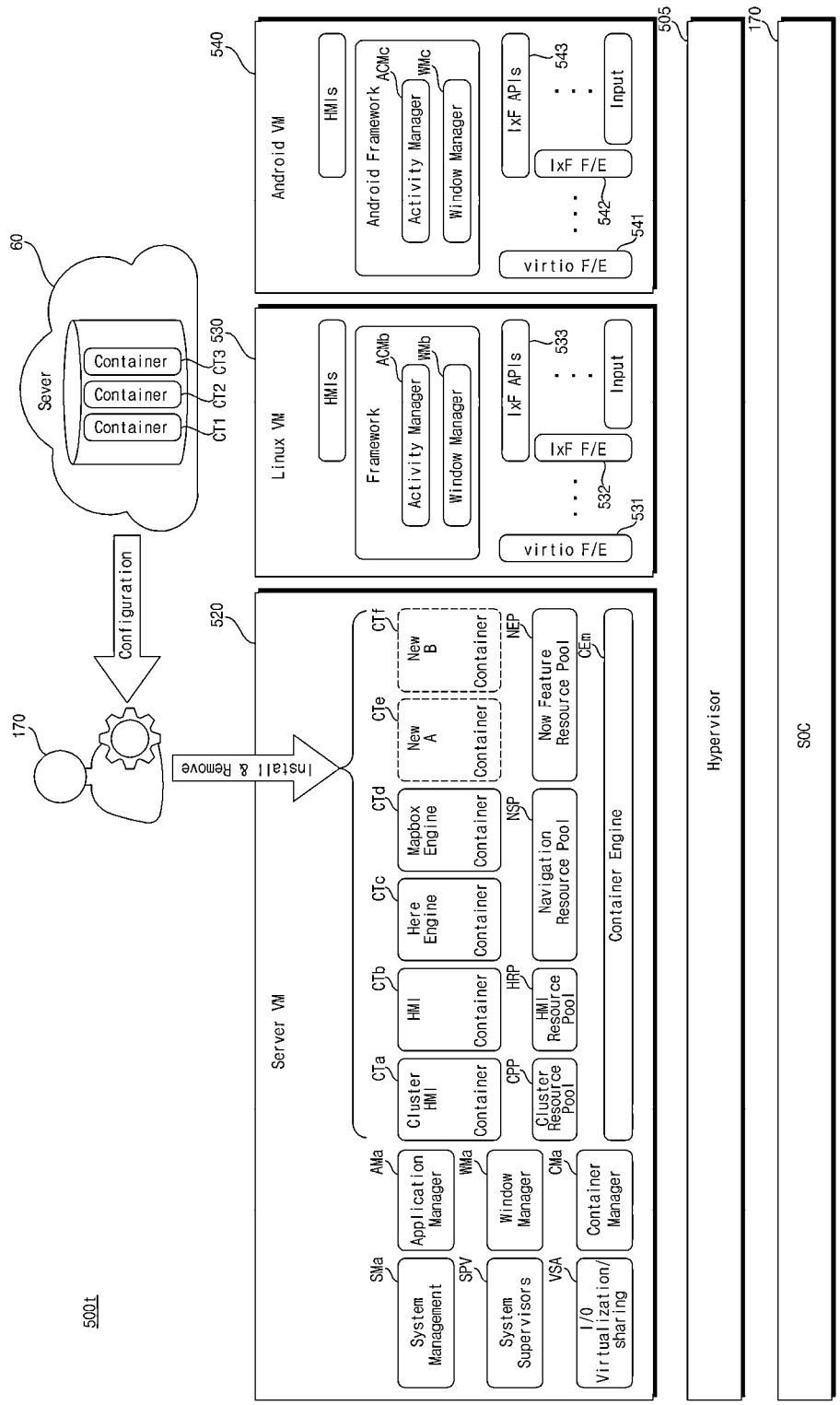
FIG. 18 is a diagram illustrating a system executed in a signal processing device according to another embodiment of the present disclosure.

FIG. 18 is a diagram illustrating a system executed in a signal processing device according to another embodiment of the present disclosure.

Referring to the drawing, a system 500*t* executed in the signal processing device 170 according to an embodiment of the present disclosure may execute the first to third virtual machines 520, 530, and 540.

Particularly, the system 500*t* executed in the signal processing device 170 may execute the first to third virtual machines 520, 530, and 540 on the hypervisor 505 in the processor 175.

The first virtual machine 520, which is a server virtual machine, may execute system management SMa for overall system control, system supervisors SPV for overall system management, and input/output (I/O) virtualization VSA.

Meanwhile, the I/O virtualization VSA may correspond to the input and output server interface 522 of FIG. 5 and the like.

Meanwhile, the first virtual machine 520, which is a server virtual machine, may execute a container engine CEm for container execution and the like.

In the drawing, an example of executing a plurality of containers is illustrated, and more specifically, an example is illustrated in which the second virtual machine 530 includes a cluster HMI cluster CTa, an HMI cluster CTb, a Here Engine cluster CTc related to a digital map, a map box engine cluster CTd, a first new cluster CTe, and a second new cluster CTf.

The cluster HMI cluster CTa may execute on a cluster resource pool CPP, the HMI cluster CTb may execute on an HMI resource pool HRP, the Here Engine cluster CTc and the map box engine cluster CTd may execute on a navigation resource pool NSP, and the first new cluster CTe and the second new cluster CTf may execute on a new feature resource pool NEP.

Meanwhile, the first virtual machine 520, which is a server virtual machine, may execute the container engine CEm, and may execute at least one container CTe to CTf on the container engine CEm.

Meanwhile, the first virtual machine 520, which is a server virtual machine, may execute a container manager CMa for managing the container engine CEm or at least one container CTe to CTf.

Meanwhile, the first virtual machine 520, which is a server virtual machine, may execute a window manager WMa for window management.

Meanwhile, the first virtual machine 520, which is a server virtual machine, may execute an application manager AMa for application management.

Meanwhile, the second virtual machine 530, which is a guest virtual machine, may execute on the Linux Operating System (OS), and in order to execute applications, the second virtual machine 530 may execute a physical device driver 531, the input and output client interface 532, APIs 533 for controlling the input and output client interface 532, framework including an activity manager ACMb and a window manager WMb, HMI, and the like.

Meanwhile, unlike the second virtual machine 530, the third virtual machine 540 which is a guest virtual machine may execute on the Android operating system, and in order to execute applications, the third virtual machine 540 may execute the physical device driver 541, the input and output client interface 542, APIs 543 for controlling the input and output client interface 542, framework including an activity manager ACMb and a window manager WMb, HMI, and the like.

FIGS. 19 to 22 are diagrams referred to in the description of FIG. 18.

Figure 19:
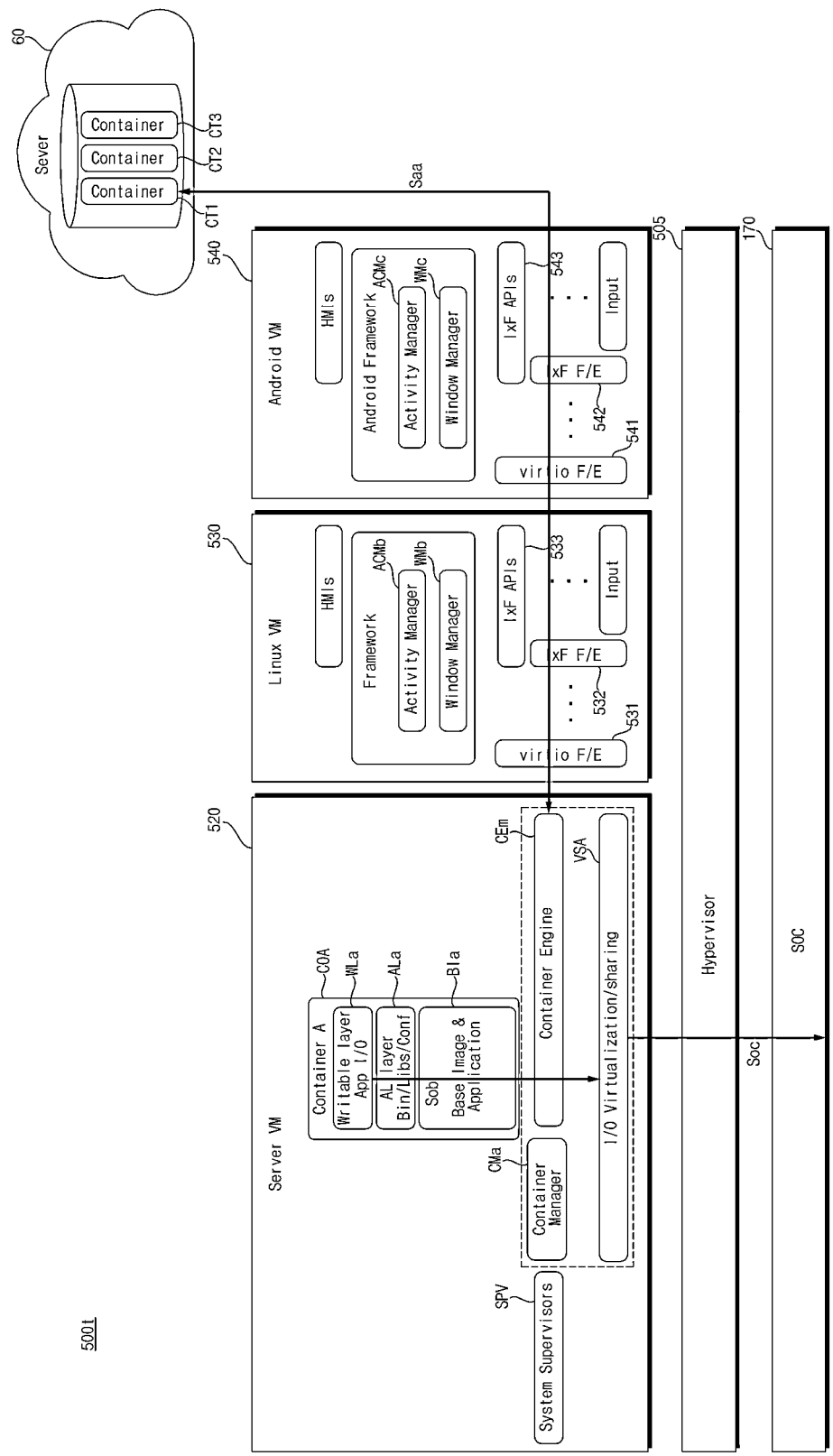
FIGS. 19 to 22 are diagrams referred to in the description of FIG. 18.

First, FIG. 19 is an example of installing and executing a container in the first virtual machine 520 of FIG. 18.

Referring to the drawing, the system 500*t* executed in the signal processing device 170 according to an embodiment of the present disclosure may execute the first to third virtual machines 520, 530, and 540.

Meanwhile, the first virtual machine 520, which is a server virtual machine, may execute a container engine CEm, and may execute the container COA on the container engine CEm.

Meanwhile, the first virtual machine 520, which is a server virtual machine, may execute a container manager CMa for managing the container COA.

Meanwhile, the container COA in the first virtual machine 520 may be any one which is selected from among a plurality of containers CT1 to CT3 in the server 60, to be installed and executed.

Meanwhile, the first virtual machine 520 according to another embodiment of the present disclosure executes at least one container COA that is executed on the container engine CEm, and the container COA includes the abstraction layer ALa that varies based on platforms, operating systems, or executed applications.

As the abstraction layer ALa varies based on platforms, operating systems, or executed applications, various arrangements may be provided for each platform, operating system, or application, and the abstraction layer may be simply configured based on circumstances.

Accordingly, the container COA may be efficiently installed and executed. Particularly, the container COA may be efficiently installed and executed based on platforms, operating systems, or executed applications. In addition, a storage space required for installing the container COA may be minimized.

Meanwhile, in order to generate another container COA, the processor 175 may share and transmit some of the binary, framework, library, and configuration files, which are required for application execution, in the abstraction layer ALa of the container COA. Accordingly, the container COA may be efficiently installed and executed. In addition, a storage space required for installing the container COA may be minimized.

Meanwhile, the second virtual machine 530 and the third virtual machine 540 may execute on different operating systems.

Meanwhile, the processor 175 may download a service container from the server 60 (SDa). In the drawing, an example is illustrated in which the downloaded service container is sent to the container engine CEm executed in the processor 175.

Meanwhile, the processor 175 may generate an abstraction layer ALa based on the downloaded service container. In the drawing, an abstraction layer ALa including binary, library, and configuration files is illustrated.

The abstraction layer ALa is an additional layer that is added according to an embodiment of the present disclosure and may be added on a base image layer Bla. In addition, a writable layer WLa may be generated on the abstraction layer ALa.

That is, the container COA may include the base image layer Bla, the abstraction layer ALa on the base image layer Bla, and the writable layer WLa on the abstraction layer ALa.

Figure 20:
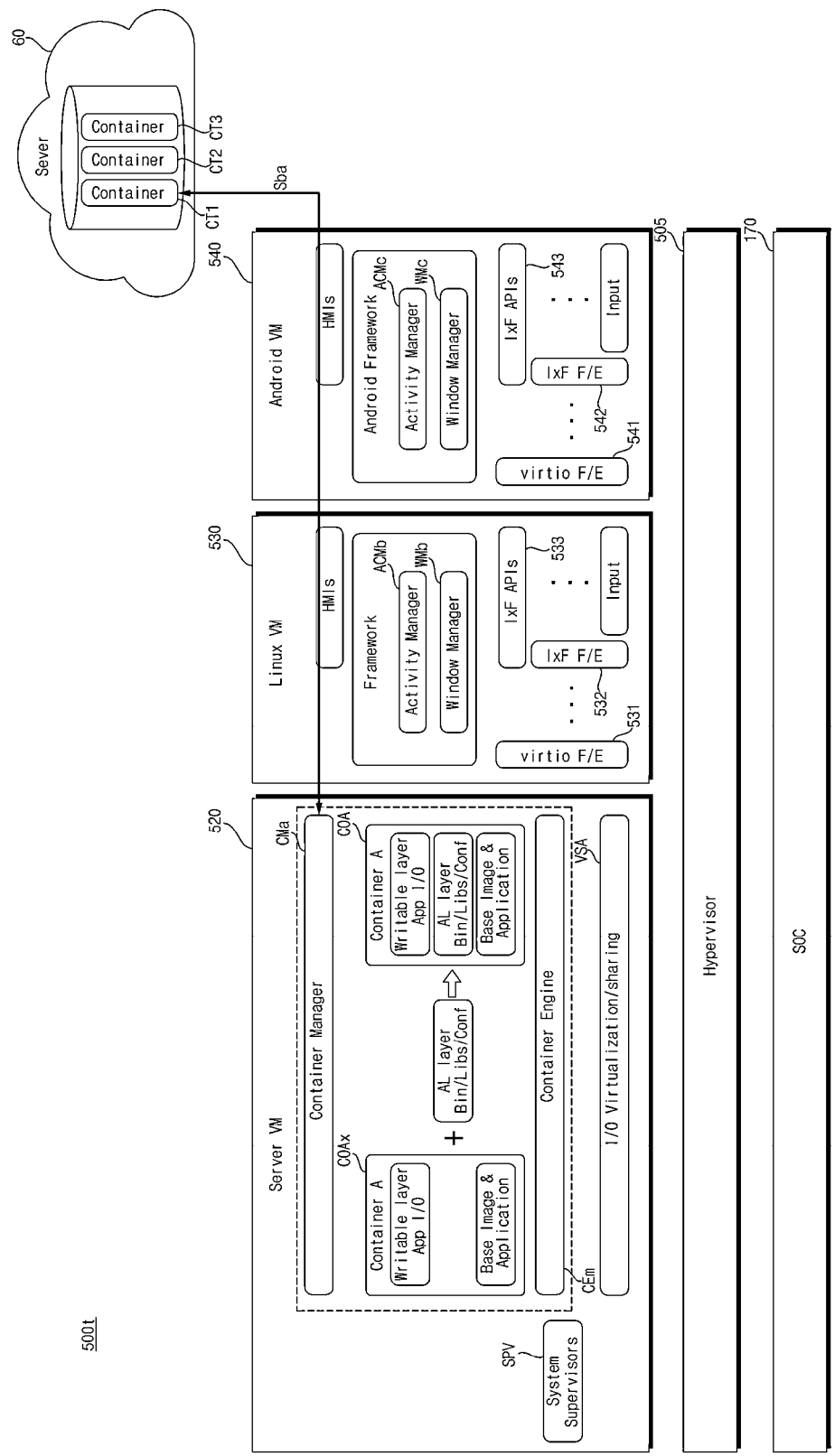

FIG. 20 illustrates an example in which a first container COAx includes only a base image layer and a writable layer on the base image layer, with no abstraction layer included therein.

As illustrated in FIG. 20, if no abstraction layer is included in the first container COAx, the container manager CMa in the first virtual machine 520 executed in the processor 170 receives a pure service container Sea from the server 60 (S1235), and extracts an abstraction layer from the received pure service container (S1240).

The extracted abstraction layer ALa may include binary, library, and configuration files required for an application.

Then, as illustrated in FIG. 20, the container manager CMa in the second virtual machine 530 executed in the processor 170 may install the service container COA including the extracted abstraction layer ALa (S1245).

Accordingly, by adding the abstraction layer ALa to the existing first container COAx, a new container COA may be efficiently installed and executed.

Particularly, by reusing the existing first container COAx, the container COA may be efficiently installed and executed. In addition, a storage space required for installing the container COA may be minimized.

Meanwhile, the processor 175 may configure the abstraction layer ALa based on system information from the first virtual machine 520 and binary, library, and configuration files in the first virtual machine 520, in addition to information from the server 60. Accordingly, the container COA may be efficiently installed and executed.

Meanwhile, the processor 175 may download a service container from the server 60 and may reassemble the abstraction layer ALa based on platforms, which will be described below with reference to FIG. 21.

Figure 21:
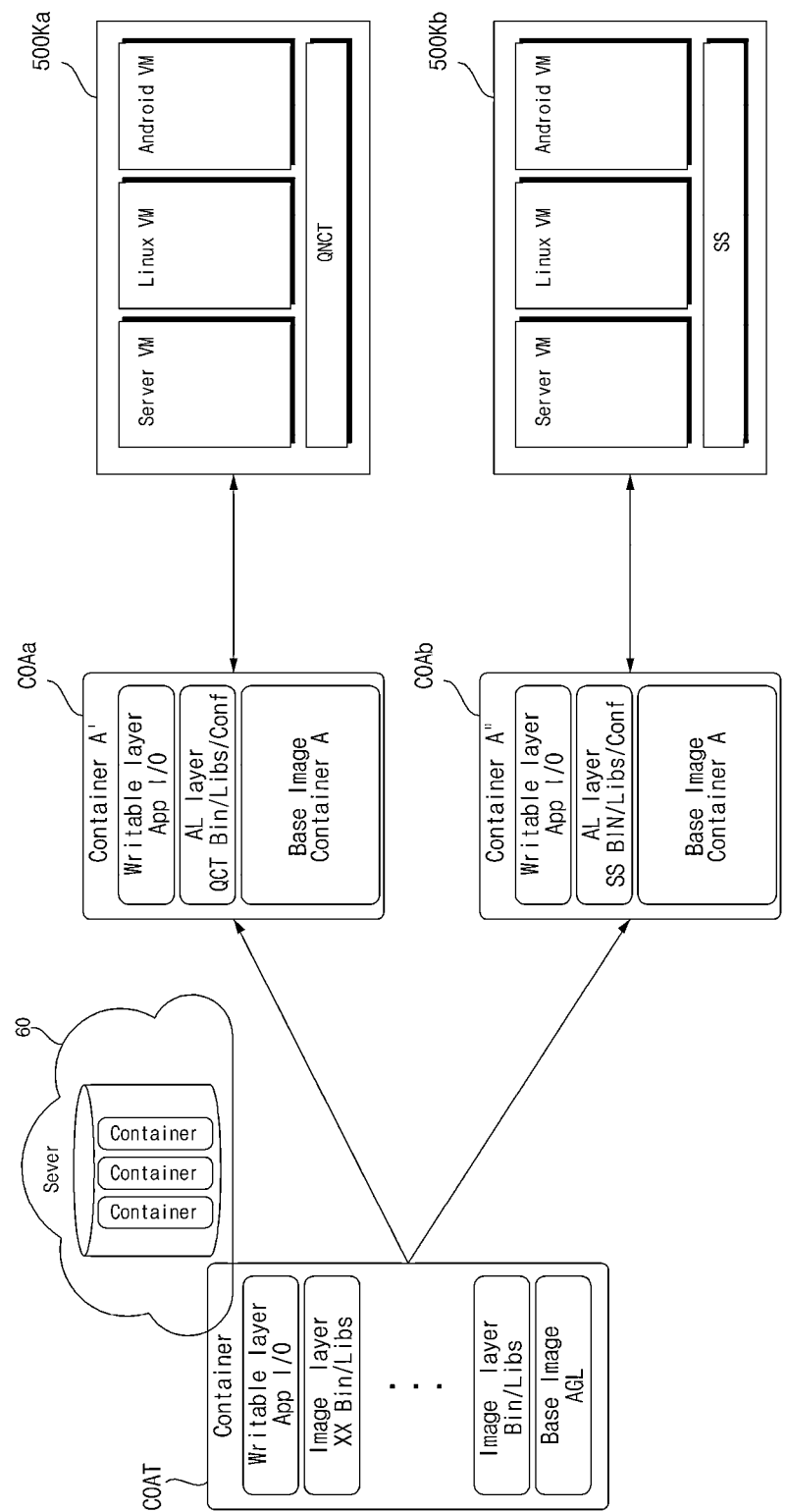

FIG. 21 is a diagram illustrating an example of installing containers COAa and COAb in different platforms.

Referring to the drawing, upon receiving a service container COAT from the server 60, the processor 175 may reassemble the abstraction layer ALa based on platforms.

For example, as illustrated herein, if the container is installed in a first platform 500Ka, the processor 175 may be configured to install the first container COAa including a first abstraction layer ALa.

In this case, the first abstraction layer ALa may include binary, library, and configuration files based on the first platform.

In another example, as illustrated herein, if the container is installed in a second platform 500Kb, the processor 175 may be configured to install the second container COAb including a second abstraction layer ALa.

In this case, the second abstraction layer ALa may include binary, library, and configuration files based on the second platform.

That is, when the container is executed in the first virtual machine 520 based on the first platform 500Ka, the container COA may include the first abstraction layer ALa, and when the container is executed in the second virtual machine 530 based on the second platform 500Kb different from the first platform, the container COA may include the second abstraction layer ALa which is different from the first abstraction layer ALa. Accordingly, the container COA may be efficiently installed and executed based on the platforms.

Similarly, if the container is installed in the first virtual machine 520 that executes on a first operating system, the processor 175 may be configured to install the first container COAa including the first abstraction layer ALa.

In this case, the first abstraction layer ALa may include binary, library, and configuration files based on the first operating system.

In another example, if the container is installed in the second virtual machine 530 that executes on a second operating system, the processor 175 may be configured to install the second container COAb including the second abstraction layer ALa.

In this case, the second abstraction layer ALa may include binary, library, and configuration files based on the second operating system.

That is, when the container is executed in the first virtual machine 520 based on the first operating system, the container COA may include the first abstraction layer ALa, and when the container is executed in the first virtual machine 520 based on the second operating system different from the first operating system, the container COA may include the second abstraction layer ALa which is different from the first abstraction layer ALa. Accordingly, the container COA may be efficiently installed and executed based on the operating systems.

Meanwhile, if the container is installed in the first virtual machine 520 for a first application, the processor 175 may be configured to install the first container COAa including the first abstraction layer ALa.

In this case, the first abstraction layer ALa may include binary, library, and configuration files for the first application.

In another example, if the container is installed in the first virtual machine 520 for a second application, the processor 175 may be configured to install the second container COAb including the second abstraction layer ALa.

In this case, the second abstraction layer ALa may include binary, library, and configuration files for the second application.

Meanwhile, when the container is executed in the first virtual machine 520 for the first application, the container COA may include the first abstraction layer ALa, and when the container is executed in the first virtual machine 520 for a second application different from the first application, the container COA may include the second abstraction layer ALa which is different from the first abstraction layer ALa. Accordingly, the container COA may be efficiently installed and executed based on the executed applications.

Figure 22:
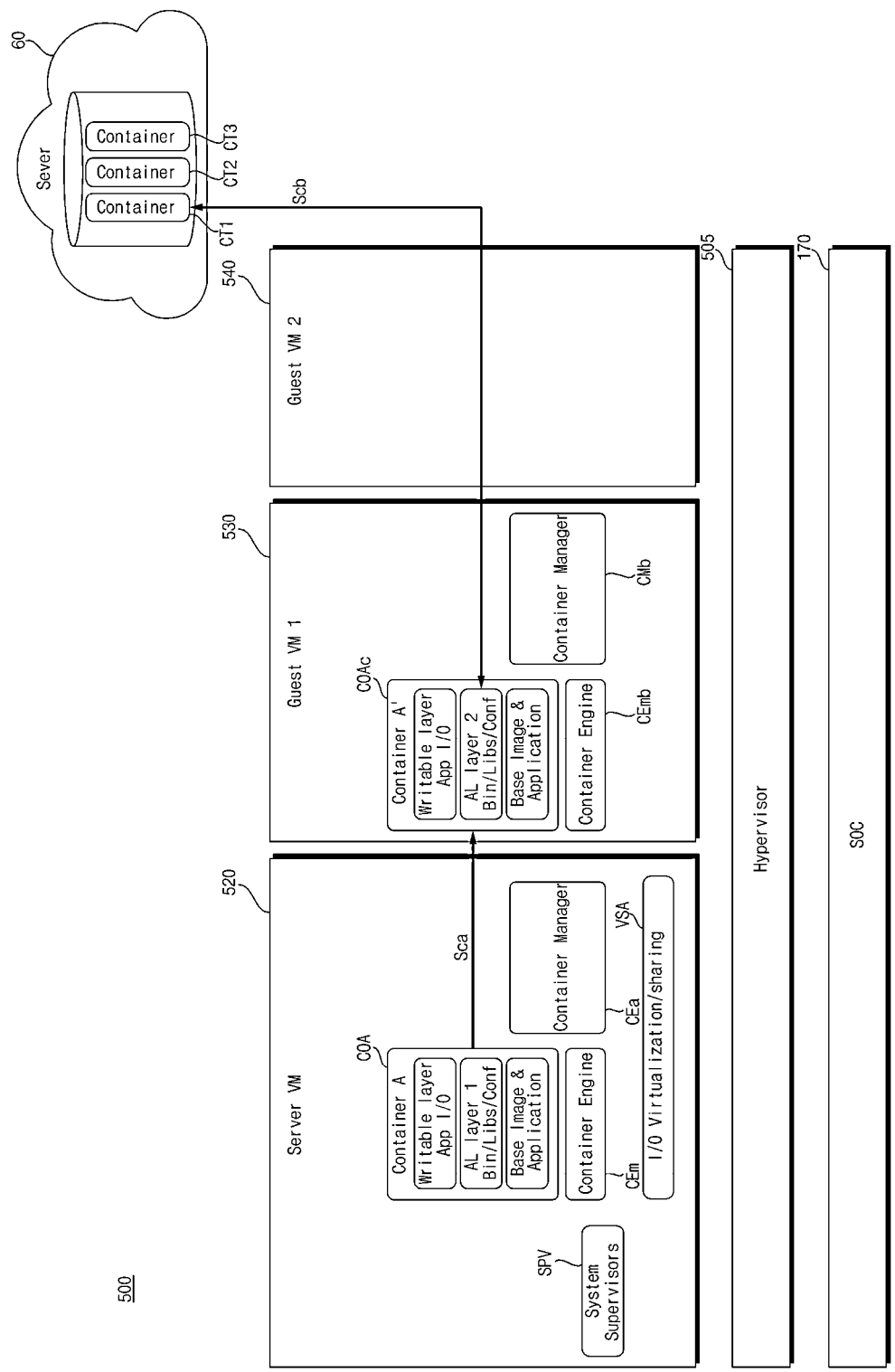

FIG. 22 is a diagram explaining movement of a container.

Referring to the drawing, in order to move the first container COA in the first virtual machine 520 to the second virtual machine 530 among the first to third virtual machines 520 to 540 executed in the signal processing device 170, the first virtual machine 520 first transmits container-related information to the second virtual machine 530 (Sca).

In this case, the container-related information may be information related to the service container, except the abstraction layer ALa in the first virtual machine 520.

That is, the processor 175 may transmit the service container, except the abstraction layer ALa in the first virtual machine 520, to the second virtual machine 530.

Then, the second virtual machine 530 may receive information about the second abstraction layer from the server 60.

Further, the second virtual machine 530 may generate the second container COAc in the second virtual machine 530 based on the information related to the service container which is received from the first virtual machine 520 and the information about the second abstraction layer which is received from the server 60.

Accordingly, the second container COAc may be efficiently installed and executed in the second virtual machine 530. Further, by receiving the information about the second abstraction layer from the server 60, a storage space required for installing the second container COAc may be minimized.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising:
a processor configured to perform signal processing for a display located in a vehicle,
wherein the processor is configured to execute first to third virtual machines,
wherein the first virtual machine operates as a server virtual machine, the second virtual machine and the third virtual machine operate as guest virtual machines, and the second virtual machine executes at least one container on a container engine,
wherein the container comprises an abstraction layer changed based on a platform, an operating system, or an executed application, and
wherein the processor is configured to download a service container from a server, check dependency of a pre-installed first container, generate the abstraction layer based on the downloaded service container, and add the abstraction layer in the first container.

2. The signal processing device of claim 1, wherein the abstraction layer in the container comprises binary, library, and configuration files required for the application.

3. The signal processing device of claim 1, wherein the container comprises a base image layer, the abstraction layer on the base image layer, and a writable layer on the abstraction layer.

4. The signal processing device of claim 1, wherein:
when the container is executed in the second virtual machine based on a first platform, the container comprises a first abstraction layer; and
when the container is executed in the second virtual machine based on a second platform different from the first platform, the container comprises a second abstraction layer different from the first abstraction layer.

5. The signal processing device of claim 1, wherein:
when the container is executed in the second virtual machine based on a first operating system, the container comprises a first abstraction layer; and
when the container is executed in the second virtual machine based on a second operating system different from the first operating system, the container comprises a second abstraction layer different from the first abstraction layer.

6. The signal processing device of claim 1, wherein:
when the container is executed in the second virtual machine for a first application, the container comprises a first abstraction layer; and
when the container is executed in the second virtual machine for a second application different from the first application, the container comprises a second abstraction layer different from the first abstraction layer.

7. The signal processing device of claim 1, wherein the processor is configured to execute a hypervisor and to execute the first to third virtual machines on the hypervisor.

8. The signal processing device of claim 1, wherein the processor is configured to execute a container engine in the second virtual machine and to execute the container on the container engine.

9. The signal processing device of claim 1, wherein the processor is configured to configure the abstraction layer based on system information from the first virtual machine and binary, library, and configuration files in the second virtual machine.

10. The signal processing device of claim 1, wherein the processor is configured to download a service container from a server and to reassemble the abstraction layer based on the platform.

11. The signal processing device of claim 1, wherein the abstraction layer in the container comprises binary, library, and configuration files related to the platform, binary, library, and configuration files related to the application, and binary and library files for executing the container.

12. The signal processing device of claim 1, wherein the processor is configured to share and transmit some of binary, framework, library, and configuration files, which are required for executing the application, in the abstraction layer of the container for generating another container.

13. The signal processing device of claim 1, wherein the second virtual machine and the third virtual machine execute on different operating systems.

14. A display apparatus for vehicles, the display apparatus comprising:
a first display;
a second display; and
a signal processing device comprising a processor configured to perform signal processing for the first display and the second display,
wherein the signal processing device comprises a processor configured to perform signal processing for a display located in a vehicle,
wherein the processor is configured to execute first to third virtual machines,
wherein the first virtual machine operates as a server virtual machine, the second virtual machine and the third virtual machine operate as guest virtual machines, and the second virtual machine executes at least one container on a container engine,
wherein the container comprises an abstraction layer changed based on a platform, an operating system, or an executed application, and
wherein the processor is configured to download a service container from a server, check dependency of a pre-installed first container, generate the abstraction layer based on the downloaded service container, and add the abstraction layer in the first container.

15. A signal processing device comprising:
a processor configured to perform signal processing for a display located in a vehicle,
wherein the processor is configured to execute first to third virtual machines,
wherein the first virtual machine operates as a server virtual machine, the second virtual machine and the third virtual machine operate as guest virtual machines, and the second virtual machine executes at least one container on a container engine,
wherein the container comprises an abstraction layer changed based on a platform, an operating system, or an executed application, and
wherein the processor is configured to transmit a service container, except the abstraction layer in the second virtual machine, to the third virtual machine, and to generate a second container in the third virtual machine based on the service container and a second abstraction layer received from the server.

16. A signal processing device comprising:
a processor configured to perform signal processing for a display located in a vehicle, wherein the processor is configured to execute first and second virtual machines, wherein the first virtual machine operates as a server virtual machine, the second virtual machine operates as a guest virtual machine, and the second virtual machine executes at least one container on a container engine, wherein the container comprises an abstraction layer changed based on a platform, an operating system, or an executed application, and wherein the processor is configured to download a service container from a server, check dependency of a pre-installed first container, generate the abstraction layer based on the downloaded service container, and add the abstraction layer in the first container.

17. The signal processing device of claim 16, wherein:

when the container is executed in the second virtual machine based on a first platform, the container comprises a first abstraction layer; and when the container is executed in the second virtual machine based on a second platform different from the first platform, the container comprises a second abstraction layer different from the first abstraction layer.

18. The signal processing device of claim 16, wherein:

when the container is executed in the second virtual machine based on a first operating system, the container comprises a first abstraction layer; and when the container is executed in the second virtual machine based on a second operating system different from the first operating system, the container comprises a second abstraction layer different from the first abstraction layer.

19. The signal processing device of claim 16, wherein:

when the container is executed in the second virtual machine for a first application, the container comprises a first abstraction layer; and when the container is executed in the second virtual machine for a second application different from the first application, the container comprises a second abstraction layer different from the first abstraction layer.

* * * * *